United States Patent [19]

Miu et al.

[11] Patent Number: 4,488,227
[45] Date of Patent: Dec. 11, 1984

[54] PROGRAM COUNTER STACKING METHOD AND APPARATUS FOR NESTED SUBROUTINES AND INTERRUPTS

[75] Inventors: Ming T. Miu, Chelmsford; John J. Bradley, Framingham, both of Mass.

[73] Assignee: Honeywell Information Systems Inc., Waltham, Mass.

[21] Appl. No.: 446,748

[22] Filed: Dec. 3, 1982

[51] Int. Cl.³ .............................................. G06F 9/42
[52] U.S. Cl. .................................................. 364/200
[58] Field of Search ......................... 364/200 MS File

[56] References Cited

U.S. PATENT DOCUMENTS

| | | | |
|---|---|---|---|
| 3,909,797 | 9/1975 | Gross et al. | 340/172.5 |
| 4,287,559 | 9/1981 | Esley et al. | 364/200 |
| 4,297,743 | 10/1981 | Appell et al. | 364/200 |
| 4,340,933 | 7/1982 | Miu et al. | 364/200 |
| 4,398,244 | 8/1983 | Chu et al. | 364/200 |
| 4,438,492 | 3/1984 | Harmon, Jr. et al. | 364/200 |

OTHER PUBLICATIONS

Handling Multilevel Subroutines and Interrupts in Microcomputers, James F. Vittera, *Computer Design*/Jan. 1973, pp. 109-115.
Designing Interrupt Structures for Multiprocessor Systems, Rajen Jaswa, *Computer Design*/Sep. 1978, pp. 101-110.
Handle Microcomputer I/O Efficiently to Synchronize Program Execution with I/O Operation, Pick the Right I/O Scheme, and You Cut Hardware and Software Costs, *Electronic Design* 13, Jun. 21, 1978, pp. 70-76, by Dr. D. Philip Burton and Dr. Arthur L. Dexter.
Improved Microprocessor Interrupt Capability Gives You Easy and Efficient Access to Peripherals, and with Proper Instructions, Enables the Ps to Handle I/O Like a Mini, *Electronic Design* 9, Apr. 26, 1978, pp. 96-100, by Masatoshi Shima and Roy Blacksher.

*Primary Examiner*—Raulfe B. Zache
*Attorney, Agent, or Firm*—William A. Linnell; Nicholas Prasinos

[57] ABSTRACT

A computer system which facilitates the execution of nested subroutines and interrupts is disclosed. As each branch transfer within the program is executed by a control area logic, a microcommand initiates the transfer of the return address, which has been derived from the address in the present routine, to a first register of a push down stack. In addition, the microcommand also pushes down one level the contents of all of the registers in the stack containing previously stored return addresses. Thus, a sequential return to unfinished routines or subroutines is provided. When the subroutine or hardware interrupt service routine is completed, a code in the address field enables the return address of the previously branched from or interrupted routine to be retrieved from the first register in the push down stack and to provide it as the address of the next instruction to be executed. The retrieval of the return address from the push down stack also pops all other stored return addresses one level in the stack. In addition to providing multiple levels of subroutine and interrupt nesting, any number of subroutines or hardware interrupts may be partially completed since the last operating subroutine or hardware interrupt service routine is always the first one to be completed. Logic is also provided to detect the occurrence of a hardware interrupt during a return sequence such that the requirement to simultaneously push and pop the stack is properly handled.

27 Claims, 6 Drawing Figures

PROGRAM COUNTER STACKING METHOD AND APPARATUS FOR NESTED SUBROUTINES AND INTERRUPTS

BACKGROUND OF THE INVENTION

1. Field of the Invention

This invention relates to data processing systems and more specifically to a data processing system which provides for execution of nested subroutines and interrupts.

2. Description of the Prior Art

The operations carried out in a data processing system and the order in which they occur are stated by means of a program stored in a memory. To alleviate the programmer's problem of completely specifying each series of operations to be performed and to better utilize the capabilities of a data processor, common functions which may be required several times in one program or may be utilized in other programs are usually provided. Each common function may be specified as a subroutine wherein a subroutine includes a sequence of instructions.

Subroutines may be utilized for a number of common functions, for example, trigonometric functions using mathematical approximations. Rather than rewrite the series of operations several times, the programmer merely has to write one set of instructions to perform the operation and call it a number of times. Thus, for a routine requiring a value of a trigonometric function, such as cosine, a branch operation to the cosine subroutine in the digital data processor is executed.

Often times it has been found that one subroutine will call another subroutine in order to complete its operation. When this situation occurs, complications arise since the return address, i.e., the next address from the branching subroutine must be stored and recalled by the data processor. Thus while the efficiency of the overall program is enhanced by providing for a particular function in only one place in the data processor, it is often times found that inefficiencies arise in calling and returning from the various subroutines both as to time considerations and hardware and/or space limitations.

In the prior art, a number of solutions for transferring to and from subroutines have bee provided. One solution involves the transferral of the next instruction location to the first location of the subroutine. In this design, the last subroutine instruction accesses the first location of the subroutine. This first location contains the return address to the next instruction (i.e., one instruction past the instruction that branched to the subroutine) thus enabling the data processor to continue sequencing through the program. This method suffers disadvantages since handling of several common transfers complicates the situation. For example, it is often advantageous to transfer operations from a first subroutine to a second subroutine which utilizes the first subroutine. In other situations, it may be advantageous if the first subroutine recalls itself. These transfers are difficult, and sometimes impossible to achieve with data processing systems of the above types without modification or without increasing the number of instructions. When the first subroutine is called for a first time, the the address of next microinstruction in the main routine is transferred to the first subroutine location. When the first subroutine is recalled by an intermediate routine, the address of the next instruction in the intermediate routine is transferred to the same location in the first subroutine thus destroying the original contents. As a result, while the first subroutine can return to the intermediate routine, it cannot return to the main routine.

In data processing systems which permit a first or second subroutine to recall the first subroutine, an instruction may be provided to move the return address to a specified storage location. The last subroutine instruction is then altered so as to include the address of the specified storage location. Although this system permits one subroutine to call another subroutine, i.e., to have the latter subroutine nest, and permit a partially completed subroutine to be subsequently used for other purposes, one reserve memory location and several instructions are required for each nesting level. Increasing the number of these memory locations for each nested subroutine increases the complexity of the control circuitry. In addition, programming complexity is increased because the last subroutine instruction must be modified to address the proper memory location for each subroutine. Therefore, this approach becomes more cumbersome as the number of nesting levels are increased.

Another type of data processing system utilizes vacant locations in memory for storing the return addresses of the subroutine or routine previously executed. The last instruction of the subroutine branches to a designated memory location. In order to exploit this system, however, two registers, one a pointer to the vacant memory locations and another which provides for the current value of the register and the memory address, are required. While this type of data processing unit overcomes some of the previous problems, it still results in supplemental instructions to indicate each new level of subroutines with a concurrent greater execution time required.

A more recent solution to this problem is found in U.S. Pat. No. 3,909,797 entitled, "Data Processing System Utilizing Control Store Unit and Push Down Stack for Nested Subroutines", which is incorporated herein by reference. In this patent, the data processing system has a microprogrammed control store unit which enables the sequencing of the central processing subsystem. This patent provides for the nesting of subroutines programmed within the firmware that controls the control store unit, but the principles of the invention are equally applicable to software programs or firmware microprograms. The control store unit provides a branching microinstruction to a microprogram subroutine via a microcommand for enabling the return address of the current operating microprogram routine to be stored. The microcommand also enables a push down stack such that previously stored return microprogram addresses are moved down (pushed) one level. Upon completion of the microprogram subroutine, the control store unit provides a branch field for enabling a multiplexer to select the return address contained on the top of the push down stack and provide it to the current address register in the system. The branch field also raises one level the previously stored return addresses in the push down stack.

Interrupts are used in a data processing system to make it responsive to events that occur asynchronously to the execution of the program. These asynchronous events may be faults within the data processing system or change of status of devices controlled by the data processing system. For example, by interrupting the data processing system, an input/output (I/O) device can signal that it requires attention or service by the data processing system. Such interrupts can be used to signal the completion of an I/O operation or a system fault such as a memory error. As in the case of subroutines, interrupts can divert the program flow. In the case of interrupts, program flow is diverted to an interrupt service routine which is programmed to handle the type of event that caused the interrupt. Upon completion of the execution of the interrupt service routine, the interrupt service routine must cause the data processor to resume execution of the program at the return address that was stored upon interruption.

One method for storing the return address is to assign fixed locations within memory to each type of interrupt for storing the return address of the program that was interrupted. Using this method, when the interrupt service routine is completed, it can reload the data processor's program counter from the fixed memory location associated with a particular type of interrupt and resume execution of the program that was executing just prior to the occurrence of the interrupt. This method has the disadvantage that interrupt service routines can not easily share common program instructions because in order to return to the interrupted program, the service routine must retrieve the interrupt return address from a fixed memory location that differs with each interrupt.

A different approach to handling interrupt return addresses is found in U.S. Pat. No. 4,340,933 entitled "Data Processing System Having Centralized Nonexistent Memory Address Detection", which is incorporated herein be reference. In this patent, which deals with hardware interrupts that interrupt the execution of a firmware microprogram, the microprogram return address is stored in a special register (the hardware interrupt return address register) and further hardware interrupts are prevented until completion of the microprogram hardware interrupt service routine. Inhibiting subsequent interrupts insures that the first microprogram return address stored in the hardware interrupt return address register will not be destroyed by a second return address being stored over it by the occurrence of a second hardware interrupt. This method, although allowing interrupt service routines to share common program instructions because all interrupt service routines restore execution to the interrupted program by reloading the program counter from the one interrupt return address register, still has the disadvantage that interrupts and subroutines can not easily share common program instructions.

Therefore, what is needed is a method of storing return addresses that will allow the nesting of subroutine calls and the servicing of interrupts in a common and efficient manner.

OBJECTS OF THE INVENTION

Accordingly, it is a primary object of this invention to provide an improved data processing system wherein subroutine transfers and interrupts are expedited.

It is another object of this invention to provide a new and improved system for storing return addresses when branching to subroutines or responding to asynchronous interrupts and for automatically enabling the branched to subroutine or the interrupt response routine, upon completion, to resume program execution at a return address.

It is a further object of the invention to provide an improved technique for employing nested subroutines and interrupts for use in data processing and computing systems which technique is efficient, reliable and results in overall time saving.

This invention is pointed out with particularity in the appended claims. An understanding of the above and further objects and advantages of this invention can be obtained by referring to the following description taken in conjunction with the drawings.

SUMMARY OF THE INVENTION

The foregoing objects are achieved according to one embodiment of the invention according to one mode of operation thereof, by providing in a data processing system microprocessor, a control area which enables the sequencing of the microprocessor. The control area provides a branching microinstruction to the subroutine via a microcommand for enabling the return address of the current operating routine to be stored. The microcommand also enables a push-down stack so that the previously stored return addresses are pushed down one level. The control area further provides for generating vectored interrupt addresses which correspond to the highest priority non-inhibited pending interrupt. These vectored interrupt addresses are provided to the next address register in place of the address generated by the current microinstruction and the address generated by the current microinstruction is pushed onto the push-down stack one level upon the occurrence of an interrupt. Upon completion of a subroutine or an interrupt service routine, the control area provides an address field for enabling a multiplexer to select the return address contained in the top of the push-down stack to be provided to the next address register in the control area. This popping of the push-down stack also raises one level the previously stored return addresses. Means are also provided so that if an interrupt occurs when returning from a subroutine or interrupt service routine, the push-down stack is neither popped nor pushed and the vectored address is provided to the next address register as the address of the next microinstruction to be executed. In the preferred embodiment, the push-down stack is implemented using shift registers.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
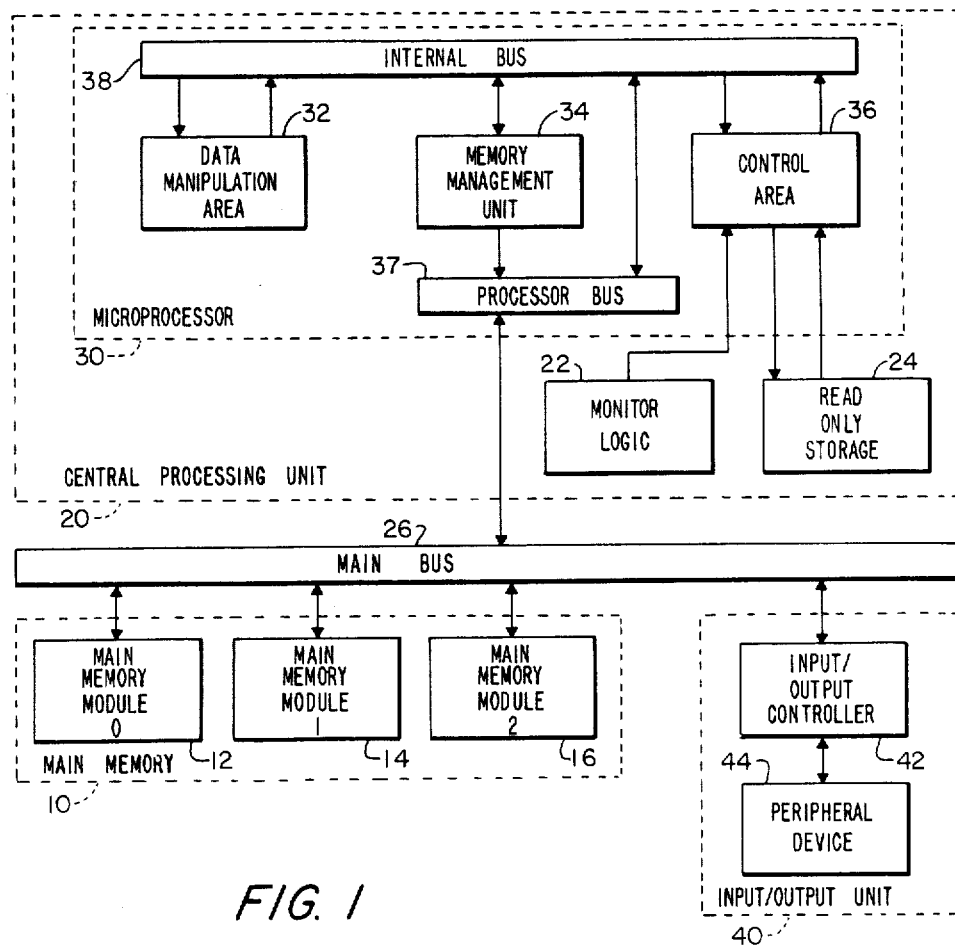
FIG. 1 is a general block diagram of a data processing system utilizing the present invention.

Although the above discussion of the invention background has been primarily in terms of software and the nesting of software routines and interrupts, the principles are equally applicable to firmware routines and interrupts. The following discussion of the invention will be in terms of the preferred embodiment in which the invention is embodied within a microprocessor for use in nesting firmware subroutines and interrupts.

Prior to describing the structure and operation of the invention in conjunction with the drawings, it is to be noted that for convenience of explanation, the embodiment depicted in the drawing is shown to be capable of nesting four subroutine or interrupt levels. However, it is of course realized that in actual practice the number of subroutine or interrupt levels may be much more than four with an appropriate increase in the hardware which is employed. Alternatively, rather than effecting an enlargement of the hardware, an overflow procedure may be employed. In the latter situation, in the event that it were desired to nest subroutine or interrupt levels in excess of four, the microprocessor could revert to other implemented mechanisms for handling subroutines or interrupts in excess of four.

The implementation of the embodiment described in the drawings is effected with a given arrangement of circuitry. However, it is understood that other logic arrangements may be employed in carrying out the invention to adapt the invention to various types of data processors. Accordingly, it is not intended to be limited to the specific schemes shown in the drawing.

Referring now to the drawings, FIG. 1 illustrates the overall system in which the nested subroutine and interrupt implementation of the present invention may be used. More particularly, FIG. 1 shows a main memory subsystem 10, a central processing unit (CPU) 20 and an input/output (I/O) unit 40. The main memory subsystem 10 consists of three metal oxide semiconductor modules 12, 14 and 16. The three modules are interfaced to the central processor unit 20 and the input/output unit 40 via main bus 26. The main bus 26 gives the capability of providing access to and control of all memory modules and input/output units.

The central processing unit 20 executes word oriented instructions that operate on fixed and variable length fields. The basic unit of information in the central processor is a 16-bit word consisting of two 8-bit bytes. These words of information are used in groups of one, two or four for instructions or fixed or floating point operands. Bytes are also used in variable length fields as decimal or alphanumeric data.

CPU 20 is comprised of microprocessor 30, monitor logic 22, and Read Only Storage (ROS) 24. Microprocessor 30 is an NMOS, 16-bit chip capable of arithmetic, logic, and control operations, driven by a 48-bit external firmware microinstruction words which in the preferred embodiment are contained in ROS 24. The microprocessor 30 design permits the execution of the CPU 20 16-bit software instruction repertoire.

Microprocessor 30 is designed to directly control input/output (I/O) and memory operation for ease in integrated system designs. The microprocessor 30 design permits greater control and integration by use of a 48-bit external firmware microinstruction word that provides true horizontal microprogramming allowing up to 12 simultaneous micro-instructions per 48-bit microinstruction word. The microprocessor 30 design also permits 8 external hardware interrupts which generate vectors to firmware microprogram routines as well as allowing 5 external software interrupts that are handled under firmware control. In addition, microprocessor 30 provides for 10 external monitor bits originated in monitor logic 22 that are sensed and controlled by sophisticated test branch and major branch operations by logic within microprocessor control area 36 which allows for sophisticated branching operations to be performed within the firmware.

Microprocessor 30 is comprised of 5 major internal hardware logic areas as shown in FIG. 1. The five major logic areas are the data manipulation area 32 which includes the arithmetic logic unit (ALU), the memory management unit (MMU 34), the control area 36, the processor bus 37, and internal bus 38.

The processor bus 37 consists of 20 address/data lines, one memory address violation line and three general purpose control lines. Processor bus 37 is connected to main bus 26 and is used to provide addresses to the main memory 10 and input/output unit 40 and to receive and send data to main memory 10 and input-/output unit 40.

Internal bus 38 is the major path for communications of information between the other four areas of the microprocessor chip. Internal bus 38 is 20-bit wide. There are 12 sources of information to internal bus 38 under control of the 11 micro-ops within the 48-bit microinstruction word. The ALU is the default source to internal bus 38 if none of the eleven defined micro-ops are used.

The data manipulation area 32 performs arithmetic and logic operations on data and does memory address generation. Data manipulation area 32 is comprised of an indicator register, various discreet registers, a register file, and arithmetic logic unit (ALU), and a shifting mechanism. One of these discreet registers is used as a 20-bit memory address register for the CPU. This program counter contains the 20-bit memory address of the software instruction that is being executed by the central processing unit 20. The register files contains seven 16-bit software addressable data address register, 7 software addressable base registers, and a variety of other registers all of which are associated with the software program being executed by the CPU 20. The register file also contains a variety of work registers which are used by the firmware program from ROS 24 for temporary storage of information during firmware operations. The shifting mechanism is used to ability to perform various shift operations (i.e., open/close, arithmetic/logical, left/right) on either 16-bit or 32-bit operands.

The control area 36 of microprocessor 30 is logically divided into 3 areas: input latches for control, testable registers, and the next address generation. Control area 36 is described in greater detail in reference to FIG. 2.

The MMU 34 section of microprocessor 30 is comprised primarily of: a register file, a 12-bit address for base relocation, a 9-bit comparator for checking the size of a memory segment, several 2-bit ring comparators for evaluating access rights to a given segment, and storage flip-flops for indicating potential memory violations. During any CPU generated memory address cycle, the MMU 34 translates the software logical address containing a segment number, a block number and an offset value presented by internal bus 38 into a physical address which is placed on processor bus 37 which in turn is transmitted to main memory 10 via main bus 26.

As can be appreciated as the description so far, CPU 20 executes software programs, the instructions of which are fetched from main memory 10, and performs arithmetic and logical operations on data also contained in main memory 10. The software program executed by CPU 20 has the ability to manipulate general and base address registers that are software visible and the current software instruction is pointed to by a program counter. These general registers, base address registers and program counter, which are visible to the software being executed by CPU 20, are physically contained within the data manipulation area 32 of microprocessor 30.

Detailed operation of CPU 20 of FIG. 1 is controlled by microprocessor 30 under the control of firmware microinstructions stored in ROS 24. Each location in ROS 24 can be interpreted as controlling one microprocessor machine cycle. As each location of ROS 24 is read, the contents are decoded by control area 36 resulting in a specific operation within microprocessor 30. By grouping ROS locations, firmware microinstruction sequences are obtained that can perform a specific operation or software instruction associated with CPU 20. As each software instruction is initiated, certain bits within the operation code field of the software instruction are used to determine the starting address of the firmware microinstruction routine contained within ROS 24. The testing of certain flip-flops which are set or reset by software instruction decoding done by microprocessor 30 allow the microprocessor to branch to a more specific firmware microinstruction sequence within ROS 24 when necessary.

Connected to main bus 26 is a input/output unit 40. The input/output controller 42 is that portion of the input/output unit 40 which completes a data path from a peripheral device 44 to main memory 10 via main bus 26. I/O controller 42 provides a path through which the peripheral commands are initiated, in addition to controlling resulting data transfers.

Figure 2:
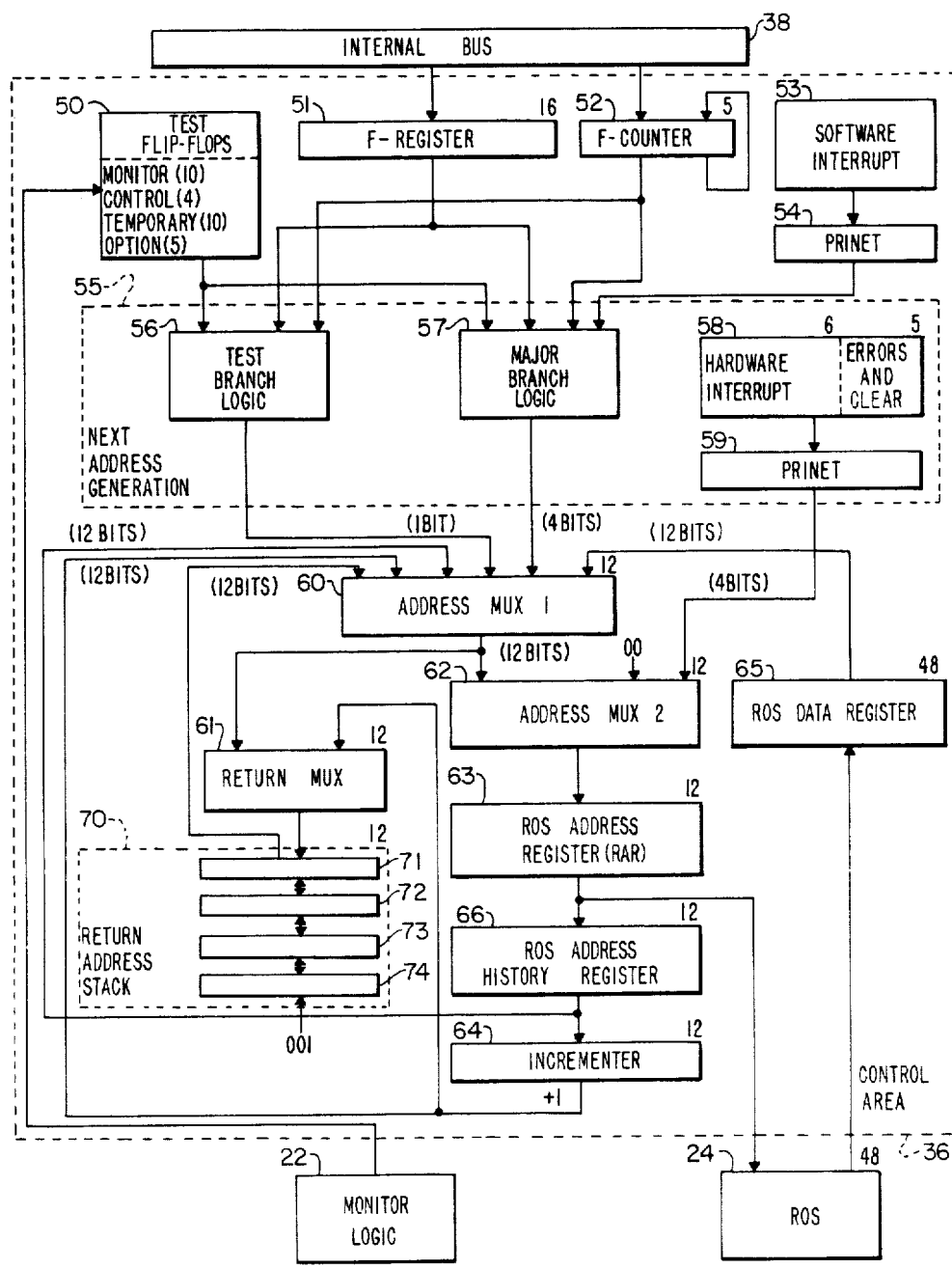
FIG. 2 is a block diagram of a portion of the control area of the microprocessor of FIG. 1 which carries out the principles of the present invention.

Referring now to FIG. 2 which illustrates the control area 36 of FIG. 1 in greater detail. Control area 36 contains additional logic and circuitry, but for the purposes of the invention, the logic has been limited to that shown in FIG. 2. FIG. 2 also illustrates internal bus 38, monitor logic 22 and read only storage (ROS) 24.

In FIG. 2, the number next to the upper right hand corner of the blocks represents the number of bits of information contained in the register represented by the block.

ROS 24 may be a read only memory (ROM) or a random access memory (RAM) or any other form of memory device capable of holding firmware microinstructions. The ROS 24 contains the firmware microinstructions (or control words) which are used by microprocessor 30 to control the operation of central processing unit and more particularly to execute the software instructions of CPU 20. For each microprocessor machine cycle, a control word is fetched out of ROS 24.

ROS 24 is coupled to ROS data register 65 which receives the microinstruction word fetched from read only storage 24. Each microinstruction contains an address portion and a command portion. The address portion in the microinstruction word identifies the address of the next location to be read from read only storage 24 which will be the next microinstruction to be executed by microprocessor 30. The command portion of the microinstruction identifies the operations to be performed by the microprocessor during the execution of the current microinstruction The address portion of the microinstruction word may be contained in a predetermined number of bits, for example, in the preferred embodiment it is contained in bits 0 through 12 of the microinstruction word (see FIG. 3). The command portion of the microinstruction may also be contained in a predetermined number of bits, for example, in the preferred embodiment it is contained in bits 13 through 47 (see FIG. 3). The command portion may be further broken down into a number of fields which comprise subcommands of the microinstruction.

Before describing the microinstruction word in greater detail with respect to FIG. 3, the other elements of FIG. 2 will be described. Monitor logic 22 provides status information with respect to CPU 20 and is loaded into test flip-flops 50 such that the status may be tested by the firmware. In addition to holding ten bits of dynamic status information from monitor logic 22, test flip-flop 50 hold five bits which sample the status of various CPU options. The CPU option bits should be thought of as static in nature and indicate whether or not a specific hardware option is present or not within the data processing system. In addition, test flip-flop 50 contains four control flip-flops which are available to be set or reset or to have a bit transferred under control of the firmware. These four control flip-flops are testable by the firmware. There are also ten temporary flip-flops in flip-flops 50 which are loaded during each firmware cycle with dynamic information such as whether there has been a carry or overflow from bit 16 of the ALU or a carry or overflow from bit 20 of the ALU or whether certain bits on the internal bus 38 are equal to 0, etc. These ten temporary flip-flops are also testable by firmware.

The F-register 51 is a 16-bit instruction register that is loaded form internal bus 38. All bits of the F-register are testable by firmware. The low-order four bits of F-register 51 also constitute the low-order four bits of the five-bit counter F-counter 52. F-counter 52 is a five-bit counter that can be loaded form internal bus 38. F-counter 52 can be incremented or decremented. The four low-order bits of F-counter 52 are also decoded such that a 16-bit mask can be placed on internal bus 38 under firmware control.

There are five possible conditions that can cause a software interrupt. These conditions are latched in software interrupt register 53. Software interrupt prinet 54 prioritizes these conditions and generates a vectored address for input into major branch logic 57.

The next address generation section 55 of control area 36 contains the logic necessary for sequencing the read only storage (ROS) 24. Test branch logic 56 is used to test 64 test conditions which can result in a 2-way branch address for ROS address register 63. These 64 test conditions are testable under firmware control and with the output of the test branch logic 56 being one bit of information into address multiplexer 1 60. Inputs to test branch logic 56 are provided by test flip-flops 50, F-register 51 and F-counter 52.

Major branch logic 57 provides 15 major test branch matrixes. The majority of the inputs to these matrixes are from F-register 51 (in various combinations). Other inputs are from the monitor and option bits of test flip-flops 50. The output of major branch logic 57 is four bits of address information which is provided to address multiplexer 1 60.

Register 58 provides the bits of information that correspond to the ten possible conditions that can cause a hardware interrupt. Hardware interrupt prinet 59 prioritizes these ten possible conditions and produces a four-bit output that is used by address multiplexer 2 62 to produce the 12-bit vectored hardware interrupt address when one of these ten possible conditions occur.

The output of address multiplexer 1 60 provides the 12-bit nominal next address which will be loaded into ROS address register 63 and used to fetch the next microinstruction from ROS 24. This 12-bit address is nominal in the sense that this nominal next address will be used as the next address only if a hardware interrupt does not occur. A hardware interrupt will not occur if no hardware interrupts are pending or if pending hardware interrupts are inhibited by the setting of the interrupt inhibit bit within the microinstruction word (see bit 34 in FIG. 3).

Address multiplexer 2 62 is used to select between the 12-bit nominal next address generated by multiplexer 1 60 and the vectored hardware interrupt address that is produced by combining the 4-bits from hardware interrupt prinet 59 with 8 leading 0 bits. The output of address multiplexer 2 62 is the 12-bit next address which is loaded into ROS address register (RAR) 63. The output of RAR 63 is used to provide the address of the next microinstruction to be fetched from ROS 24. The output of RAR 63 is also input to ROS address history register 66.

ROS address history register 66 is provided so that early in the execution of the current microinstruction contained in ROS data register 65, while the next microinstruction address is being developed and transferred to ROS address register 63, ROS address history register holds the address of the current microinstruction. This current microinstruction address is used in developing the next microinstruction address if the current microinstruction calls for its use. The current address from ROS address history register 66 is also used after being incremented by incrementer 64 as the return address from microsubroutines and hardware interrupt service routines.

Incrementer 64 increments by a predetermined number (e.g., by 1 in the preferred embodiment) the address contained in RAR address history register 66. Incrementer 64 is a 12-bit incrementer which will be used to source the return address stack 70 via return multiplexer 61 during a PUSH microcommand. The output of incrementer 64 is also used to provide the next ROS address value to RAR 63 for INC and INCK microcommands via address multiplexer 1 60 and address multiplexer 2 62. The INC microcommand specifies that the next ROS address is to be the current ROS address incremented by one and the INCK microcommand specifies that the next ROS address value is to be the current address value plus 1 and in addition a constant, as specified in other unused address field bits within the microinstruction, is to be placed on internal bus 38.

Return address stack 70 is a 4 by 12-bit last in first out (LIFO) array used for storing the return addresses of subroutines and hardware interrupts. Return address stack 70 is initialized to hexadecimal value of 001 during clear time and its bottom location is set to 001 (hexadecimal) during each POP (return) microcommand. A PUSH microcommand causes the top of return address stack 70 to be sourced by the output of incrementer 64. A hardware interrupt causes the top of stack 70 to be sourced by the output of address multiplexer 1 60, which is the nominal next address. Incrementer 64 transfers to return address stack 70 the incremented address history from ROS address history register 66 when one subfield of the next command portion of the ROS data register 65 specifies a PUSH microcommand. This PUSH microcommand enables the storing of the return address of the microprogram microinstruction that is being executed while branching to a microprogram subroutine.

In response to the PUSH microcommand, incrementer 64 provides that the incremented current ROS address from ROS address history register 66 to return address stack 70, which comprises a plurality of registers 71 through 74. Functionally, return address stack 70 is a push down storage device which comprises a plurality of work registers arrayed in a column. The only output from the stack is from top register 71 which is connected to address multiplexer 1 60. The only inputs return address stack 70 are from the top and bottom. When an address is pushed onto stack 70, it goes into register 71 after the other addresses already in the stack are pushed down the column one register. As an address is removed from the column (popped up), it is provided by top register 71 to address multiplexer 1 60 and each address stored in return address stack 70 moves up one hardware register in the column. During this pop operation, the bottom register 74, which is vacated, is loaded with the address 001 (hexadecimal). The stack can be visualized as a deck of cards, wherein access to the cards of the deck is only possible by adding or removing cards one at a time to or from the top of the deck and wherein a predetermined card (hexadecimal value 001) is added to the bottom of the deck as each card is removed from the top of the deck.

Return address stack 70 thus stores the incremented current address as is provided from ROS address history register 66 when the executing microprogram branches to a subroutine. In addition, return address stack 70 stores the nominal next address output by address multiplexer 1 60 whenever a hardware interrupt occurs which vectors the execution of the firmware to a predetermined location within ROS 24 as determined by the particular hardware interrupt that has occurred. These addresses stored in return address stack 70 point to the next step of the microprogram which would have been executed except for the occurrence of a branch to a microprogram subroutine or a branch to a microprogram interrupt handling routine. Since these addresses will be stored when a branch to a microprogram subroutine occurs, or when a hardware interrupt occurs, the addresses in return address stack 70 will, upon the execution of the last microinstruction in a subroutine or hardware interrupt handling routine return the microprogram to the proper sequence. This can be better illustrated by reference to FIG. 4 as described below.

Figure 3:
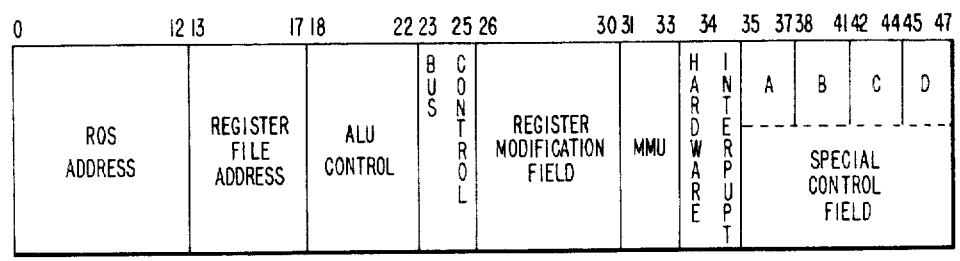
FIG. 3 illustrates the firmware microinstruction word fields of the microprocessor of FIG. 1.

FIG. 3 illustrates the firmware microinstruction word fields of microprocessor 30 of the preferred embodiment. This microinstruction word is comprised of 48 bits (bits 0–47). Bits 0 through 12 are used as the ROS address field, bits 13 through 17 are used to select registers in the register file, bits 18 through 22 are used to control the arithmetic and logic functions of the ALU and the inputs to its ports, bits 23 through 25 are used as bus control, bits 26 through 30 are used as a register modification field, bits 31 through 33 are used as memory management unit control, bit 34 is used to inhibit the occurrence of a hardware interrupt and bits 35 through 47 are used as a special control field.

The special control field (RDDT bits 35 through 47) is used to modify as well as supplement certain of the other fields in the microinstruction firmware word. The special control field provides up to three simultaneous microcommands during a given microcycle. The special control field is divided into 4 subfields (A through D) as illustrated in FIG. 3. With the interpretation of some of the subfields dependent upon the contents of other subfields.

The 48 bits of the microinstructions are loaded into the ROS data register 65 at the beginning of the execution of the microinstruction. These 48 bits are referred to as signals RDDT00 through RDDT47.

The ROS address field contains 13 bits (RDDT00 through RDDT12) and is used to generate the address of the next firmware step in a given microprogram sequence. The method for generating this next address is defined by the first five bits of the ROS address field as shown below in Table 1.

TABLE 1

| RDDT Bits 0 1 2 3 4 | Operation |
|---|---|
| 1 X X X X | Jump |
| 0 1 X X X | Test Branch |
| 0 0 1 X X | Major Branch |
| 0 0 0 1 X | Increment With Constant |
| 0 0 0 0 1 | Increment Without Constant |
| 0 0 0 0 0 | Return (POP microcommand) |

A PUSH microcommand can be used in conjunction with any of the first five operations listed in Table 1. The PUSH microcommand, when used in combination with a jump or branch microcommand, allows the microprogrammer to store away into return address stack 70 a return address to which the microprogrammer will wish to return upon completion of the subroutine which was branched to. To facilitate the storing away of this return address by the person writing a microprogram, the PUSH microcommand pushes the contents of the ROS history address register 66 incremented by 1 by incrementer 64 onto the top of return address stack 70. The return (POP) microcommand is then used by the microprogrammer as the last firmware step of the called subroutine to return to the first location after the microinstruction which called the microprogram subroutine.

One exception to the next address generation being defined by the six operations described in Table 1 is that of a hardware interrupt. When a hardware interrupt is initiated, the next ROS address will be provided as a hardware vector and the ROS address generated by the ROS address field of the present firmware word will be placed on the top of the return address stack 70 by the output of address multiplexer 1 60 being selected as the output of return multiplexer 61 and pushed onto return address stack 70. If a PUSH microcommand (as specified by special control field C in bits RDDT42 through RDDT44 in conjunction with a special coding of subfields A and B) is used in conjunction with one of the first five operations shown in Table 1, then the microprogrammer must also inhibit hardware interrupts by specifying that RDDT bit 34 is a binary ONE in order to prevent a conflicting push operation being performed as the result of the occurrence of a hardware interrupt. Since a hardware interrupt can occur (normally by the occurrence of an external asynchronous event) at any time prior to the completion of a given firmware microprogram sequence, special consideration must be given to allow for the occurrence of a hardware interrupt.

The branching capabilities of the six operations defined in Table 1 are referred to as page branching and bank branching. A page is defined as 64 consecutive memory locations within ROS 24 and a bank is defined as 1024 memory locations within ROS 24 (16 Pages). The branch boundaries for the test branch operation is restricted to any location within a page. The branch boundaries for the major branch are restricted to any location within a bank. The remaining four operations of Table 1 are capable of branching or incrementing from one bank to another.

The jump operation is the only next address generation method of Table 1 that allows a branch to any of the possible 4096 locations of ROS 24. This is accomplished by providing, within the ROS address field, a 12-bit direct address of the next firmware microinstruction to be executed.

When RDDT bit 0 equals a binary ONE, RDDT bits 1 through 12 of the present ROS data word (firmware microinstruction) as contained in ROS data register 65 are delivered directly to ROS address register 63 via address multiplexer 1 60 and address multiplexer 2 62 as the next address in the firmware microprogram, assuming of course, no intervening hardware interrupt occurs. Should a hardware interrupt occur, this nominal next address would be pushed onto the top of return address stack 70 and the generated hardware interrupt vector address, as generated by concatenating eight high order binary ZERO bits with the four bit output of hardware interrupt prinet 59, as output by address multiplexer 2 62 will be loaded into ROS address register 63 as the next ROS address.

A PUSH microcommand (as defined by special control field C) can be used along with the jump operation. Hardware interrupt inhibit bit RDDT34 must be set to a binary ONE to inhibit hardware interrupts when the PUSH microcommand is used in conjunction with a jump operation. During a PUSH microcommand, the current ROS address held in ROS address history register 66 is incremented by 1 and pushed onto the top of return address stack 70 by return multiplexer 61 before the next address as specified in RDDT bits 1 through 12 is loaded into ROS address register 63.

The test branch operation of Table 1 is a two-way branch using the result of one of 64 test conditions specified as part of the ROS address field in bits 3 through 8. All test branches are restricted to branching within the current page, that is, the next ROS address generated as a result of the test will always be one of two locations (depending upon the results of the test: i.e., true or false) eight locations apart but within (64 locations) currently being address by ROS address register 63. That is, depending upon the results of the test branch, the next microinstruction will be fetched from the location determined by taking the six high-order bits from the current ROS address (from ROS address history register 66) concatenated with the six low-order bits which come from bits 2, 9, 10, 11 and 12 of the ROS address field which are used for bits positions 7, 8, 10, 11 and 12 respectively within the nominal next ROS address and with the result of the test (1 or 0 corresponding to true or false respectively) being used as bit position 9 within the nominal next ROS address.

This nominal next ROS address composed of the bits as described above, generated as the result of the test branch as specified in bits 0 through 13 in the current firmware microinstruction word, is the next ROS address assuming no intervening hardware interrupt occurs. Should a hardware interrupt occur, this addrss is placed on the top of return address stack 70 and the generated hardware interrupt vector address replaces it as the contents of the next ROS address in ROS address register 63.

The PUSH microcommand can also be used along with test branch operations. As indicated above, hardware interrupts must be inhibited (by setting RDDT bit 34 equal to a binary ONE) if the PUSH microcommand is used. If the PUSH microcommand is used in conjunction with a test branch operation, the current ROS address, which is the address of the test branch microinstruction (from ROS address history register 66) incremented by 1, will be placed on the top of return address stack 70 and the microprogram will branch to the nominal next address as determined by the output of test branch logic 56.

The major branch operation is a 16-way branch using the results of 15 test groups specified as part of the ROS address field in bits 5 through 8. All major branches are restricted to branching within the current bank (1024 locations). That is, the nominal next ROS address generated as a result of the major branch test will always be in one of 16 locations (depending on the output of the major branch matrix) 16 locations apart but within the bank (1024 locations) currently being addressed by ROS address history register 66. The nominal next ROS address is generated by taking bit 0 and 1 from the current ROS address and using them as bit 0 and 1 in the nominal next ROS address and taking bits 3, 4, 9, 10, 11 and 12 from the ROS address field and using them as bits 2, 3, 8, 9, 10 and 11 in the nominal next ROS address respectively. In addition, bits 4 through 7 in the nominal next ROS address are determined by the four-bit output by major branch logic 57.

The nominal next ROS address as described above is generated as the result of the major branch operation specified in bit 0 through 12 of the current firmware microinstruction word contained in ROS data register 65 is the next ROS address assuming that no intervening hardware interrupt occurs. Should a hardware interrupt occur, this newly generated nominal next ROS address will be placed on top of the return address stack 70 and the generated hardware interrupt vector address replaces it as the next ROS address in RAR 63.

As in the case of test branch operation, the PUSH microcommand can be used along with major branch operations. Again, as indicated above, hardware interrupts must be inhibited by setting bit RDDT34 to a binary ONE. If a PUSH microcommand is used in conjunction with a major branch operation, the current ROS address which is the address of the major branch microinstruction itself (from ROS address history register 66) plus 1 will be placed on top of the retrun address stack 70 and the microprogram will branch to the nominal next address as determined by the output of major branch logic 57.

The incrementing with a constant operation (INCK microcommand) as specified in ROS address field (bit 0 through 3 of the 13-bit field) of the current microinstruction causes the current value of the ROS address history register 66 incremented by 1 to be placed in the ROS address register for the next microcycle. In addition to this next address generation, the remaining 9 bits (RDDT bits 4 through 12) are used to generate an 8-bit constant plus a filler to the 20-bit wide internal bus 38 during the current microcycle.

The current ROS address contained in ROS address history register 66 is incremented by incrementer 64 and the result is returned to the ROS address register 63 via address multiplexer 1 60 and address multiplexer 2 62 when an increment with constant microcommand is specified in the ROS address field of a microinstruction. Should a hardware interrupt occur, this newly generated next address will be placed on the top of return address stack 70 via return multiplexer 61 and the hardware generated interrupt vector address will be placed in ROS address register 63 to be used as the next ROS address. The PUSH subcommand can be used along with the increment operations. As with all PUSH subcommands, the hardware interrupts must be inhibited by setting RDDT bit 34 to a binary ONE when using a PUSH subcommand in conjunction with an increment operation. If a PUSH microcommand is used in conjunction with an increment operation, the current ROS address incremented by one will be placed on the top of return address stack 70, in addition to becoming the next ROS address.

The increment operation (INC) subcommand as specified in the ROS address field of the microinstruction initiates the same operation as described above for the increment with constant (INCK microcommand) operation except that no constant is generated onto internal bus 38.

The return operation (POP microcommand) causes the contents of the top of return address stack 70 to be loaded into ROS address register 63 via address multiplexer 1 60 and address multiplexer 2 62 to be used as the ROS address for the next microcycle. In addition, a ROS address of 001 (hexadecimal) is loaded into the bottom of the stack into register 74 each time return address stack 70 is popped one location. This loading of the bottom of return address stack 70 with the ROS address of 1 is used to detect the case of overpopping of the stack. The overpopping of the stack will result in the microprocessor being vectored to microprogram error sequence which begins at ROS location 1. Because a return operation (POP microcommand) is fully specified by bit 0 through 4 of the ROS address field, bits 5 through 12 of the ROS address field are unused as part of the return operation.

When a return operation is specified in bit 0 through 4 of the ROS address field, ROS address register 63 receives the contents of the top of return address stack assuming no intervening hardware interrupt occurs. Should a hardware interrupt occur, the return (or pop) operation will effectively be bypassed or cancelled. This cancelling of the pop stack operation when a hardware interrupt occurs during a return operation is the logical equivalent of the popping the return address from the top of return address stack 70 and immediately, within the same microcycle, pushing it back onto the top of return address stack 70. It is this cancelling or bypassing of popping return address stack 70 when a hardware interrupt occurs during a return operation that allows the return address stack to be used to contain the return addresses for both microprogram subroutine calls and for hardware interrupts.

By having the push operation onto the stack associated with storing the return address for the hardware interrupt routine cancel the pop operation performed on the stack when returning from a microprogram subroutine or upon completion of a hardware interrupt service routine, the return address stack 70 does not have to be able to simultaneously move in opposite directions or to first pop up and then push down during one microcycle. The method by which this simultaneous movement in opposite directions is prevented, (i.e., the method by which the push operation cancels out the pop operation) will be explained in greater detail with respect to FIG. 5 below. As will be seen below in the discussion of FIG. 4, this cancelling of the stack pop operation associated with a return operation by the occurrence of the push operation associated with the occurrence of a hardware interrupt does not adversely affect the flow of control within the microprogram because the hardware interrupt routine will perform a return operation as the last step in its microprogrammed interrupt service routine.

The PUSH microcommand which is coded in the special control field (RDDT bits 35 through 47) must not be used in the same microinstruction with a return operation which is coded within the ROS address field (RDDT bit 0 through 12) because the results within microprocessor 30 in the preferred embodiment are unspecified.

As described above, a hardware interrupt forces a branch to a fixed ROS address. This ROS address is determined by a priority network (prinet 59) which has various error signals and interrupt requests as inputs from register 58. Hardware interrupts cause the next firmware generated ROS address to be pushed onto the top of return address stack 70. If the next ROS address was to have been generated from the return address stack via a return microcommand, popping of the return address stack 70 is inhibited. Hardware interrupts must be inhibited whenever a PUSH micro-operation is performed in order to prevent the requirement to doubly push the stack, the first push being associated with the PUSH microcommand itself and the second push being associated with the saving of the return address for the hardware interrupt.

When the hardware interrupt inhibit field (RDDT bit 37) is a binary ONE, hardware interrupts are inhibited, non-error condition hardware interrupts (such as those associated with memory refresh and data request) are inhibited (prevented from intervening between the execution of the current microinstruction and the execution of the next microinstruction). Hardware error condition inputs to prinet 59 (such as system clear, an attempt to access a nonexistent resource, an access violation, or a memory parity error) are not under the control of RDDT bit 34 and can intervene between any two given microcycles. The fact that hardware interrupts interrupts associated with these error conditions can not be inhibited and therefore could occur during a microinstruction which contains a PUSH microcommand does not cause a problem, because the hardware interrupt service routines associated with these noninhibitable error conditions does not do a return operation at the end and therefore do not depend upon the contents of return address stack 70 to be valid. When RDDT bit 34 is a binary ZERO, all hardware interrupts are allowed.

Figure 4:
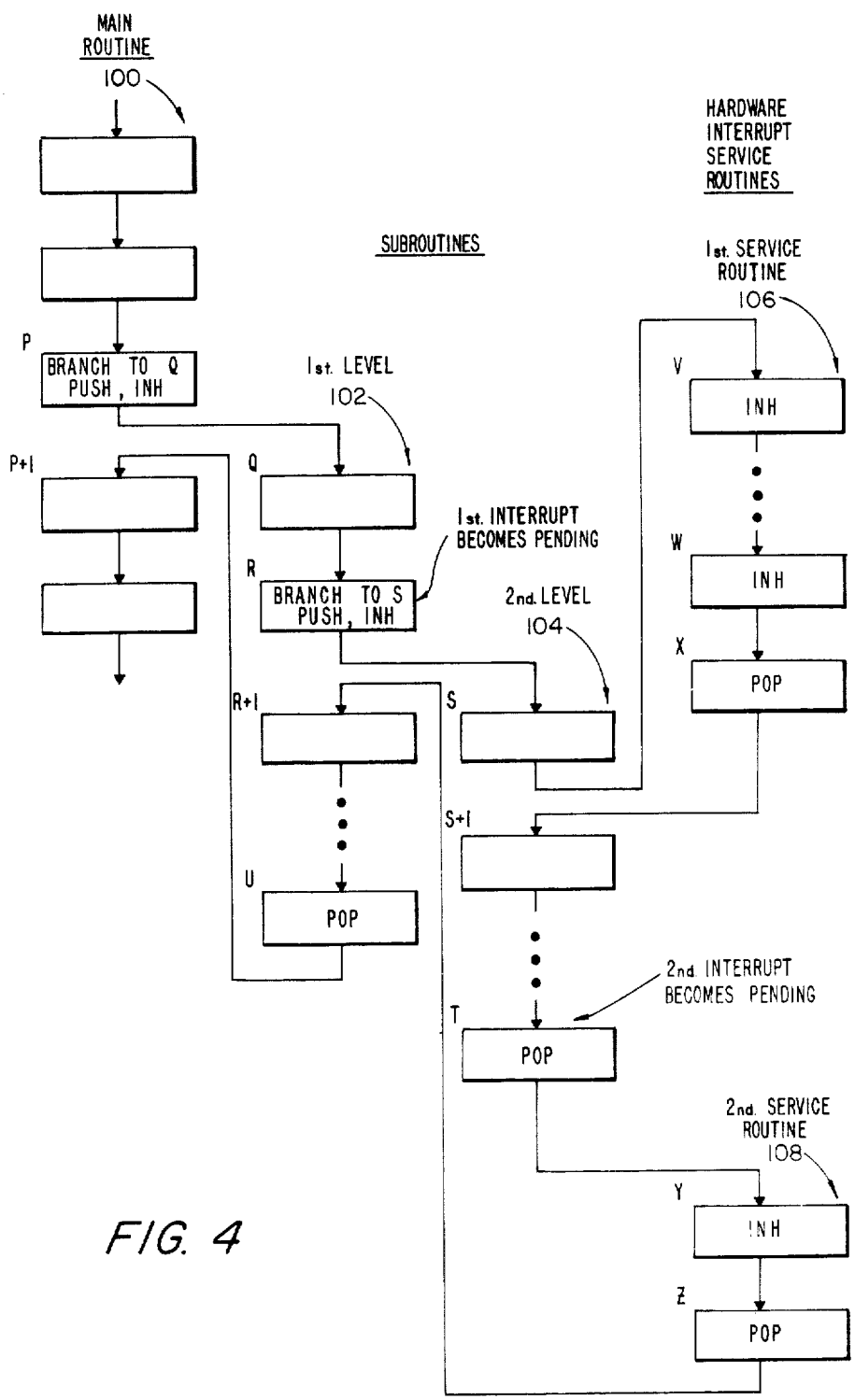
FIG. 4 illustrates a flow diagram of the execution of microinstructions of a microprogram beginning in a main routine and continuing through two subroutines and two hardware interrupt service routines in accordance with the present invention; and, FIG. 5 is a logic block diagram of circuitry utilized in the control area of FIG. 2 in accordance with the present invention.

FIG. 4 is a firmware microinstruction sequence which forms the main routine in a microprogram as indicated by 100. Main routine 100 may itself be a main microprogram routine or a microsubprogram routine and is any common sequence of microinstructions designed to perform a function. It is desired to be able to perform branches to any common sequence of microinstructions. For exemplory purposes, two microsubroutines indicated at 102 for a first level subroutine and 104 for a second level subroutine are shown. Branches to these subroutines may occur anywhere in the routine or subroutines. In addition, it is desired to be able to perform hardware interrupt service routines to process any hardware interrupts that occur during the execution of microroutine 100 or any of its associated microsubroutines. For exemplory purposes, two hardware interrupt service routines indicated at 106 for a first hardware interrupt service routine and 108 for a second hardware interrupt service routine are shown. In FIG. 4, the rectangular boxes in the microprogram indicate microinstructions. The contents of a microinstruction is indicated by the output of ROS 24 as contained in ROS data register 65.

In FIG. 4, the microinstruction which determines the jump to the first level subroutine is found at microinstruction P. This microinstruction consists of a ROS address field having a conditional or unconditional branch to microinstruction Q and a special control field indicating a PUSH microcommand along with the hardware interrupt bit being set to inhibit hardware interrupts. This firmware microinstruction which branches to microinstruction Q, pushes the return address, and inhibits hardware interrupts, is shown in rectangular box P. When this microinstruction is reached during the sequencing of the microprogram, the following operations occur. The ROS address field of the microinstruction indicates that a branch operation is to be performed. The special control field indicates that the current ROS address in ROS address history register 66 is to be incremented by incrementer 64 and pushed onto the top of return address stack 70 via return multiplexer 61. This is accomplished by incrementer 64 taking the contents of ROS address history register 66, which at this point in time contains the ROS address of instruction P, and incrementing it by 1 so that the output of incrementer 64 is the address associated with instruction P+1 and storing it via return multiplexer 61 into the top register of return address stack 70, which is register 71. Thus, at this point in time, register 71 will contain the address P+1. This microinstruction, which resides at address P in ROS 24, also has the hardware interrupt bit set to inhibit the occurrence of a hardware interrupt between the execution of the microinstruction at location P and the first instruction of the first level subroutine, which is the microinstruction at location Q.

Subsequent to the occurrence of the branch, as shown at Q, normal sequencing of the microsubroutine occurs. If the first level subroutine 102 requires another subroutine as shown at rectangular box R, then another branch to a microsubroutine is executed. Thus, the same steps as occurred at instruction P will be applicable to instruction R when the first level subroutine 102 branches to the second level subroutine 104. Thus, at instruction R, a conditional or unconditional branch is performed to the second level subroutine 104 which begins at address S in ROS 24. When instruction R is executed, the current ROS address in ROS address history register 66 is incremented by 1 by incrementer 64 and is transferred to return address register stack 70 and held in the top register 71 and the previous contents of register 71 are pushed down into register 72. Thus, at this point in the execution of the microprogram, register 71 contains the address R+1 and the register 72 contains the address P+1. Address R+1 being the instruction within the first level subroutine to which the second level subroutine is to return upon its completion and address P+1 being the address within the main routine to which the first level subroutine is to return upon its completion. The ROS address field of the microinstruction at location R has a value which will cause the microprogram to branch to rectangular box (microinstruction) S.

As shown in FIG. 4, a first hardware interrupt becomes pending during the execution of the microinstruction associated with rectangular box R. This first interrupt is of the type that can be inhibited by setting the hardware interrupt inhibit bit (RDDT34) equal to a binary ONE and therefore the hardware interrupt is not allowed to divert the normal flow of the firmware following microinstruction R. Therefore, upon the completion of the execution of microinstruction R, the branch to location S will be completed and the microinstruction associated with rectangular box S will be executed. If the first interrupt had been of the error interrupt type, the hardware interrupt would have occurred upon the completion of microinstruction R and the flow of the execution of the microprogram would have been vectored to the location associated with the hardware error interrupt.

During the execution of microinstruction S, the ROS address on the next microinstruction to be fetched from ROS 24 is computed as can be seen from examination of FIG. 4. Absence the occurrence of the hardware interrupt, which vectors the execution of the firmware to first service routine 106 beginning at location V, the normal next address would be S+1. This address would be determined either by using the ROS address field of the S microinstruction as is contained in ROS data register 65 which could indicate a jump or branch operation in which case bits within the ROS address field in ROS data register 65 would be multiplexed through address multiplexer 1 60 with or without the addition of bits from test branch logic 56 or major branch logic 57. Alternatively, if an increment operation is indicated in ROS address field of the microinstruction S, the contents of ROS address history register 66 will be incremented by 1 by incrementer 64 and the 12 bit output will be multiplexed through multiplexer 1 60. In any case, the output of address multiplexer 1 60 will be the address S+1.

Because the microinstruction S does not inhibit interrupts and the hardware interrupt is pending, the output of address multiplexer 1 60 will be multiplexed through return multiplexer 61 and pushed onto the top of return address 70 into register 71 and address P+1 will be pushed from register 72 into register 73 and address R+1 will be pushed from register 71 into register 72. At the same time, address multiplexer 2 62 will multiplex through the output of prinet 59 such that the address associated with the first hardware interrupt will be input into ROS address register 63 such that ROS address register 63 will contain the address associated with rectangular box V and that microinstruction will be fetched from ROS 24. Upon the completion of the execution of microinstruction S, microinstruction V will have been fetched from ROS 24 and be available for decoding and execution in ROS data register 65.

Before discussing the execution of the first hardware interrupt service routine 106 which contains microinstructions V through X, it should be noted that if microinstruction R did not contain the hardware inerrupt inhibit microcommand, during the execution of microinstruction R, the situation would arise in which a double push of the return address stack 70 would be required in order to preserve the proper execution sequence of the microprogram. That is, both address R+1 as output by incrementer 64 into return multiplexer 61 would have to be pushed onto return address stack 70 followed by address S as output by address multiplexer 1 60 via return multiplexer 61. Because a double push operation is not possible during the execution of one microcycle, the inhibiting of hardware interrupts is required.

If the first interrupt which becomes pending during the execution of microinstruction R was a hardware error interrupt which is not inhibitable by the setting of hardware inhibit bit 34, after microinstruction R was executed, the microprocessor would branch to microinstruction V and the first hardware interrupt service routine would begin execution without the intervening execution of microinstruction S. In this case, however, the first hardware service 106 would be different from that shown in FIG. 4 in that service routines associated with hardware error interrupts do not terminate with a pop operation. Instead, they terminate by branching to a predefined point after doing some system reinitialization function. These hardware error interrupts do not do a pop operation because a pop indicates the intent to resume execution of the microprogram where it was interrupted. These hardware errors that are not inhibitable are not of the type from which a recovery can be done and therefore a return of control of the point of interruption is not done.

Now returning to the first hardware service routine 106 which comprises microinstructions V through X, it will be noted that instruction V and W and all instructions thereinbetween have the inhibit hardware interrupt microcode within them (i.e., bit 34 set to a binary ONE). By inhibiting the occurrence of a hardware interrupt during all but the last (POP) microinstruction of a hardware interrupt service routine, the microprogrammer insures that the occurrence of a second or subsequent hardware interrupt will not interrupt the processing of the first hardware interrupt. This insures that any time dependent sequences which are initiated in by one microinstruction can be completed by a subsequent microinstruction without any intervening hardware interrupts expanding the time between the initiating and the completing microinstructions. It also has the advantage that because in the preferred embodiment, the return address stack is only four deep, that three levels of the stack may be used for calling microprogram subroutines and the fourth level can be reserved for hardware interrupts without the possibility that hardware interrupts will have to be nested more than one deep. It will be appreciated that the logic in FIG. 2 would in fact permit the nesting of hardware interrupts and if the stack was of sufficient depth to permit all of the hardware interrupts to occur without exceeding the depth of the stack, plus the depth of the maximum nesting depth of microprogram subroutine calls which is permitted, that this inhibiting of interrupts during hardware interrupt service routines would not be required (based on the assumption that a given hardware interrupt may not interrupt itself).

During the execution of the first hardware interrupt service routine 106, microinstructions V through W are executed sequentially without interruption. Microinstruction X follows the execution of microinstruction W without interruption because of the inhibit microcommand present in microinstruction W. It should be understood that microinstructions V through W contain other microcommands in addition to the INH (inhibit) microcommand which perform operations associated with servicing the particular hardware interrupt which has occurred. Likewise, microinstruction X can contain other microcommands besides the POP microcommand.

During the execution of microinstruction X, ROS data register 65 contains microinstruction X which has within it a return (pop) operation coded in the ROS address field. This return operation causes the popping of return address stack 70 which as indicated above contains address S+1 in address register 71, R+1 in register 72, P+1 in register 73, and the address 001 (hexadecimal) in register 74 prior to the POP microcommand being performed. The POP microcommand in microinstruction X causes the return address stacks 70 to be popped one location. The POP microcommand of microinstruction X causes address S+1 to be popped out of return address stack 70 from register 711 and for the contents of 72 to be loaded into register 71 the contents of register 73 to be loaded into register 72 and the contents of register 74 to be loaded into register 73 and the value 001 (hexadecimal) to be loaded into register 74. Address S+1 is loaded via address multiplexer 1 60 and address multiplexer 2 62 into ROS address register 63 where it is used to fetch the S+1 microinstruction from ROS 24 which is then loaded into ROS data register 65. Thus, following the execution of microinstruction X, execution of the second level subroutine 104 resumes with the execution of microinstruction S+1.

The execution of second level subroutine 104 continues from microinstruction S+1 on an instruction by instruction basis until microinstruction T is reached. After the execution of microinstruction X and prior to the execution of microinstruction T, return address stack 70 contains the address R+1 in register 71, the address P+1 in register 72, and the address 001 (hexadecimal) in registers 73 and 74.

FIG. 4 illustrates that a second hardware interrupt becomes pending during the execution of microinstruction T which contains a POP subcommand which, absent the occurrence of the second interrupt, would return the execution of the microprogram to microinstruction R+1 by popping the address R+1 from the top of return address stack 70. However, as indicated above, when a POP microcommand occurs simultaneously with a hardware interrupt command, the popping of the return address stack 70 is cancelled by the implicit pushing associated with responding to the hardware interrupt. Therefore, return address stack 70 is neither popped nor pushed during the execution of microinstruction T and the stack remains unchanged such that register 71 contains the address R+1, register 72 contains the address P+1 and registers 73 and 74 contain the addresses 001 (hexadecimal).

During the execution of microinstruction T, prinet 59 generates the vectored address to the second hardware interrupt service routine so that address Y is loaded into ROS address register 63 via address multiplexer 2 62. The execution of the microprogram continues with the execution of microinstruction Y which is the first instruction in the second hardware interrupt service routine 108 which is comprised of instruction Y and instruction Z. Again, as indicated above, each instruction within hardware interrupt service routine must inhibit hardware interrupts except for the last microinstruction. Also, as indicated above, instruction Y will contain other microcommands in addition to the inhibit microcommand and microinstruction Z can similarly contain other microcommands besides the POP microcommand.

During the execution of microinstruction Z, ROS data register 65 will contain the return operation in the ROS address field. This return (POP) microcommand causes return address stack 70 to be popped one location thus causing the address R+1 in register 71 to be loaded into ROS address register 61 via address multiplexer 1 60 and address multiplexer 2 62. In addition, the contents of register 72 replace the contents of register 71, and the contents of register 73 replace the contents of register 72, and the contents of register 74 replace the contents of register 73, and the address 001 is loaded into register 74. Thus, at the completion of microinstruction Z, return address stack 70 will contain the address P+1 in register 71, and the address 001 (hexadecimal) in registers 72, 73 and 74.

The popping of return address stack 70 by the POP microcommand in microinstruction Z will cause the microprogram execution to continue with the execution of microinstruction R+1 in the first level subroutine 102. The first level subroutine 102 continues executing its microinstructions until it reaches microinstruction U which contains a POP microcommand which returns the execution of the microprogram to the microinstruction after the microinstruction which branched to the first level subroutine. The POP microcommand of microinstruction U pops return address stack 70 one location and causes the address P+1 to be loaded via address multiplexer 1 60 and address multiplexer 2 62 into ROS address register 63. This will cause the microinstruction located at location P+1 in ROS 24 to be loaded into ROS data register 65 and executed. Thus, execution of the microprogram will continue with microinstruction P+1 in the main routine 100, followed by the next microinstruction which is addressed by the ROS address field of microinstruction P+1.

As can be appreciated from the above discussion of the example illustrated in FIG. 4, each explicitly microcoded PUSH microcommand associated with the branching to a subroutine causes the return address stack 70 to be pushed down one location as does each implicitly performed push operation which is associated with responding to a hardware interrupt. From the above example, it can be appreciated that the return address stack was only pushed to a level of three deep, the first push occurring when instruction P branched to the first level subroutine, the second push occurring when instruction R branched to the second level subroutine, and the third push occurring during instruction S in preparation of vectoring to the first hardware interrupt service routine.

In the example in FIG. 4, popping of the return address stack 70 occurs three times, the first time during microinstruction X at the completion of the first hardware service routine, the second time occurring at the end of the second hardware interrupt service routine during the execution of microinstruction Z and the third time occurring during the execution of microinstruction U when the first level subroutine returns to the main routine. The pop operation which would normally have been performed at the end of the second level subroutine by microinstruction T was cancelled by the implicit push operation associated with the vectoring to the second hardware interrupt service routine and beginning execution with microinstruction Y.

Figure 5:
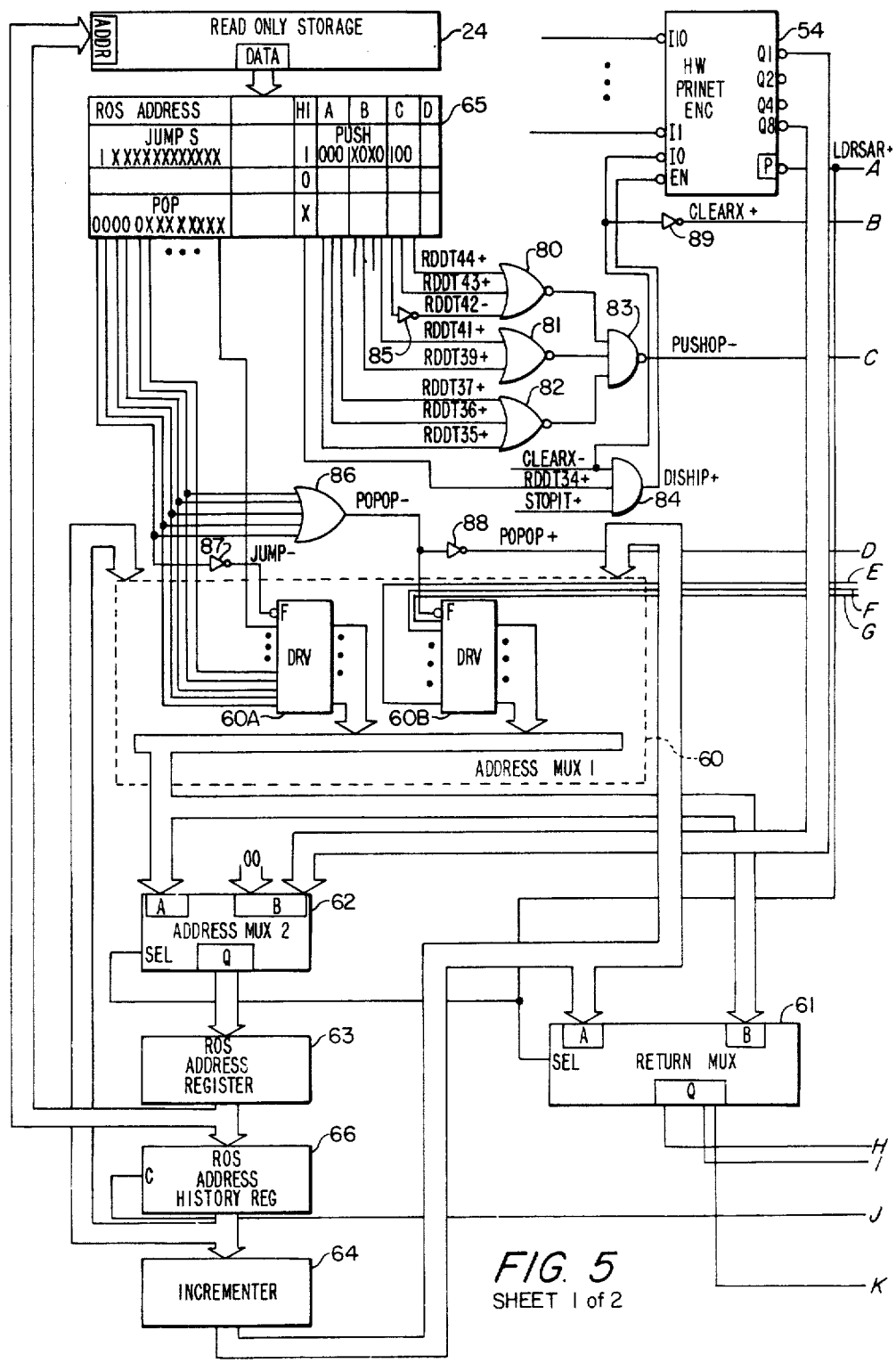
Figure 5:
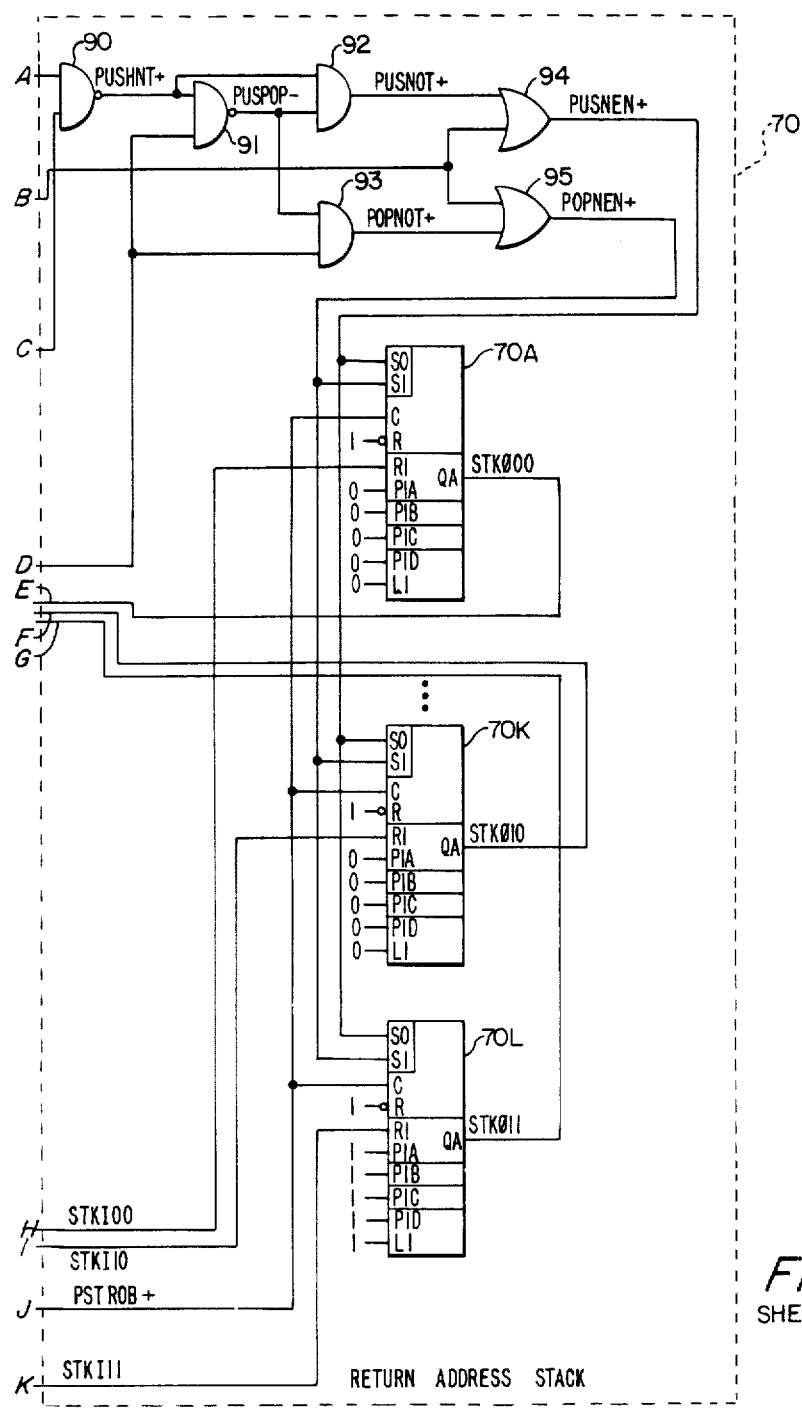

Referring now to the detailed circuitry shown in FIG. 5, the same reference numerals used previously are shown in addition to the detailed circuitry required for the operation of the hardware mechanism. In FIG. 5, the little circles at some of the inputs and outputs of the various elements are used to represent inverting inputs or outputs respectively.

In FIG. 5, return address stack 70 is shown as being comprised of twelve 4-bit bi-directional universal shift registers of the type SN74LS194 manufactured by Texas Instruments Incorporated and described in their book, *The TTL Data Book for Design Engineers*, Second Edition, copyrighted 1976 and incorporated herein by reference. In FIG. 5, only shift register 70A, which holds the most significant bits of the four 12-bit addresses in return address stack 70 and shift register 70K which holds the next to least significant bits of the four 12-bit addresses and shift register 70L which holds the least significant bits of the four 12-bit addresses stored in return address stack 70 are actually illustrated and registers 70B through 70J are not shown for simplicity. Registers 71 through 74 of return address shown in FIG. 5 because one bit of each of registers 71 through 74 is stored in shift registers 70A through 70L, respectively. The method by which the twelve 4-bit shift registers are used as a push down stack will be described in greater detail below.

FIG. 5 shows read only storage 24 which stores the microinstructions to be executed by the various units which comprise the microprocessor 30. During a cycle of operation, read only storage 24 is addressed by the contents of ROS address register 63. This causes the contents of the location specified by the address to be read into ROS data register 65.

In FIG. 5, ROS data register 65 is illustrated as containing three separate microinstructions which illustrate the three different cases of interest to be described with respect to FIG. 5. In actual operation, only one of these microinstructions would be present at any given instance in time within ROS data register 65. The top microinstruction which performs a jump to microinstruction S and also contains a PUSH microcommand. This microinstruction represents microinstruction R of FIG. 4 which does the branch to the second level subroutine 104. The middle microinstruction is any microinstruction which does not have hardware interrupts inhibited by the setting of the hardware interrupt (HI) bit within the microinstruction to a binary ONE. The bottom microinstruction is a microinstruction which contains a POP microcommand within the ROS address field and could be any one of the POP instructions of FIG. 4 such as microinstruction U, T, X or Z. This POP microinstruction is used to do a return from a subroutine or a hardware interrupt service routine.

Fields of the microinstruction word containing the next address to be accessed and the next command to control the microprocessor 30 subsystem are transferred and decoded by the functional units illustrated in FIGS. 1 and 2. Each functional unit includes logic circuits for decoding the requisite subcommands specified by the microinstruction word under the control of the system timing operations.

When first level subroutine 102 calls second level subroutine 104 by performing a branch to S microinstruction with a PUSH and inhibit (INH) microcommands, the following sequence occurs. The branch microinstruction is read out from read only store 24 and loaded into ROS data register 65 and the branching takes place in the cycle following the read out and it is developed from the ROS address field having a binary ONE in bit position ZERO. The branch microinstruction word also has a PUSH microcommand and an inhibit hardware interrupt microcommand which stores the return address into return address stack 70 and inhibits hardware interrupts respectively.

More specifically, the JUMP microcommand is decoded by inverter 87 receiving the binary ONE from ROS address field bit position 0 and producing at its output a binary ZERO such that signal JUMP−, which is connected to the output enable (F) input of driver 60A, enables driver's 60A inputs onto its outputs thus making the output of address multiplexer 1 60 to be the bits 1 through 12 of the ROS address field which contain the address of the S microinstruction. Driver 60A is a bus driver of the type that has 3-state outputs such that only one of the bus drivers that comprise address multiplexer 1 60 will have its outputs enabled at any given time. It should be noted that address multiplexer 1 60 is comprised of more than driver 60A and 60B which are illustrated in FIG. 5 and contains other inputs besides those illustrated in FIG. 5 but only those of interest with respect to the present invention are illustrated in FIG. 5.

The output of address multiplexer 1 60 which appears at the A input of address multiplexer 2 62 will be selected by the select input (SEL) being in the binary ONE state such that the output of address multiplexer 2 62 will be the address of microinstruction S which appears in bits 1 through 12 of the ROS address field. This output of address multiplexer 2 62 will be loaded into ROS address register 63 so that instruction S will be addressed in read only storage 24.

The select input signal LDRSAR+ which appears at the select (SEL) input of address multiplexer 2 62 and return multiplexer 61 is used to select between the A and B inputs of multiplexers 62 and 61. Signal LDRSAR+ which appears at the output active (P) output of hardware interrupt prinet encoder 54 will be in the binary ZERO state if one of the outputs Q1 through Q8 of encoder 54 is in the binary ZERO state. One of the outputs Q1 through Q8 of encoder 54 wil be in the binary ZERO state if one of the inputs I0 through I10 is in the binary ZERO state and input enable signal DISHIP+ which is attached to the enable input (EI) of encoder 54 is in the binary ZERO state.

In the preferred embodiment, hardware interrupt prinet encoder 54 is comprised of two cascaded type SN74148 8-line to 3-line priority encoders manufactured by Texas Instruments and described in their publication entitled, *The TTL Data book for Design Engineers*, Second Edition. The I0 input of encoder 54 is connected to receive signal CLEARX− which is a signal which will be a binary ZERO during a hardware clear condition. The other input signals, I1 through I10, are connected to the various signals which indicate a hardware interrupt request or a hardware error condition. Whenever one of these input signals, I0 through I10, is in the binary ZERO condition, encoder 54 will produce on outputs Q1 through Q8, which are binary encoded, a signal corresponding to the highest priority hardware interrupt or hardware error requesting servicing.

Because the first microinstruction illustrated in ROS data register 65 contains a binary ONE in the hardware interrupt inhibit field, signal RDDT34+ will be a binary ONE partially enabling AND gate 84. Signal CLEARX− will also be a binary ONE because it is not a clear condition. The third input of AND gate 84, signal STOPIT+, will also be a binary ONE because if no hardware error condition is present, therefore the output of AND gate 84, signal DISHIP+, will be a binary ONE and disable the outputs of encoder 54 thereby making signal LDRSAR+ a binary ONE.

The PUSH microcommand of the first microinstruction is decoded by NOR gates 80, 81 and 82 along with NAND gate 83 and inverter 85. The PUSH subcommand is specified in the special control field of the microinstruction word by having an A subfield of 000 binary, a B field of XOXO binary (where X bits are can't care conditions), and a C subfield of 100 binary. The A subfield is decoded by inputting bits 35 through 37 into NOR gate 82, the output of which will be a binary ONE if a PUSH subcommand is specified. The B subfield is decoded by inputting bits 39 and 41 into NOR gate 81, the output of which will be a binary ONE if a PUSH subcommand is specified. The C subfield is decoded by inverter 85 inverting bit 42 and using its output along with bits 43 and 44 as inputs into NOR gate 80. The output of NOR gate 80 will be a binary ONE if a PUSH subcommand is specified. If a PUSH subcommand is specified in the special control field, all three inputs to NAND gate 83 will be a binary ONE and cause the output thereof, signal PUSHOP− to be a binary ZERO.

With the PUSH signal, PUSHOP−, being a binary ZERO at one input to NAND gate 90, and the other input thereto, signal LDRSAR+, being a binary ONE indicating that no hardware interrupt is both pending and enabled, the output of NAND gate 90, signal PUSHNT+ will be a binary ONE indicating that a push operation on return address stack 70 is to be conducted either because a PUSH microcommand is encoded within ROS data register 65 or a hardware interrupt is pending and hardware interrupts are enabled. Signal PUSHNT+ is one input of NAND gate 91. The other input to NAND gate 91 is POPOP+ which is output by inverter 88 which receives as input signal POPOP− which is the output of OR gate 86.

Bits 0 through 4 of the ROS address field are input into OR gate 86 which is used to decode POP microcommands. If bits 0 through 4 are binary ZEROs, the output of OR 86 will be a binary ZERO which indicates that a pop operation is to be performed. Because bit 0 of the JUMP S microinstruction contains a binary ONE, the output of OR gate 86 will be a binary ONE causing the output of inverter 88 to be a binary ZERO.

Signal POPOP+ being a binary ZERO at one input of NAND gate 91 will cause the output thereof, signal PUSPOP−, to be a binary ONE indicating that both a push and pop operation are not being requested simultaneously. With both inputs of AND gate 92 equal to a binary ONE, the output thereof, signal PUSNOT+, will be a binary ONE indicating that a push operation is to be performed on return address stack 70. With signal PUSNOT+ being a binary ONE at one input of OR gate 94, the output thereof, signal PUSNEN+, will be a binary ONE indicating that a push operation is to be performed on return address stack 70.

The pop operation signal, POPOP+, is also one input to AND gate 93. With both inputs to AND gate 93 being a binary ZERO, the output thereof, signal POPNOT+, will be a binary ZERO indicating that a pop operation is not to be performed on return address stack 70. Because a clear operation is not being performed, the output of inverter 89, signal CLEARX+, will be a binary ZERO, and therefore both inputs to OR gate 95 will be binary ZEROs causing the output thereof, signal POPNEN+ to be a binary ZERO indicating that a pop operation is not to be performed on return address stack 70.

Signal PUSNEN+ is connected to the S0 shift mode input of each of the twelve 4-bit bi-directional shift registers 70A through 70L. Similarly, signal POPNEN+ is connected to the S1 shift mode input of the twelve 4-bit bi-directional shift registers 70A through 70L. Shift mode inputs S0 and S1 are binary encoded such that when S0 and S1 are equal to binary ZEROs, no shifting or parallel loading of the shift register occurs when the clocking signal at the clock (C) input of the shift register transitions from the binary ZERO to the binary ONE state. When S0 is a binary ZERO and S1 is a binary ONE, a left shift (pop) operation will be performed when the shift registers are clocked. When S0 is a binary ONE and S1 is a binary ZERO, a right shift (push) operation will be performed when the shift registers are clocked. When both S0 and S1 are binary ONEs, a parallel loading of all four bit positions within each shift register will be done when the clock transitions from the binary ZERO to the binary ONE state. The rest (R) input of each of the twelve 4-bit shift registers is set to a binary ONE because the registers are not reset (cleared) during operation of the system.

Late within the execution of the current microinstruction in ROS data register 65, and after the address of the next microinstruction has been loaded into ROS address register 63, clocking sigal PSTROB+, is used to clock return address stack 70 by clocking shift registers 70A-through 70L is also used to clock (load) ROS address history register 66. Therefore, simultaneously with the clocking of the return address into return address stack 70 by signal PSTROB+ transitioning from the binary ZERO to the binary ONE state, the address of the next location in read only storage 24 that is to be fetched using the next address found in ROS address register 63 will be loaded into ROS address history register 66 for use as the current address early in the execution of the next microinstruction.

Early in the execution of the current microinstruction, which is prior to clocking address S from ROS address register 63 into ROS address history register 66, ROS address history register 66 contains the address of the microinstruction in the ROS data register 65 which specified the jump to location S (in FIG. 4 this is microinstruction R). Thus, early in the execution of microinstruction R, ROS address history register 66 would contain the current address R and the output of incrementer 64 would be the address of R+1 which appears at the A input of the return multiplexer 61. As seen above, the select signal LDRSAR+ during the JUMP S microinstruction is a binary ONE causing the A output of return multiplexer 61 to be enabled onto the Q output thereof. Thus, signls STKI00 through STKI11 which appear at the shift right serial inputs (RI) of shift register 70A through 70L will correspond to the binary address R+1. Thus, when clocking signal PSTROB+ occurs late during the execution of the JUMP S microinstruction, the address R+1 will be pushed into return address stack 70 by shifting shift register 70A through 70L right one position.

Having described the functioning of the logic of FIG. 5 with respect to the JUMP S microinstruction which also inhibits interrupts and does a PUSH microcommand, the execution of the second and third microinstructions illustrated in ROS data register 65 will now be discussed. Both the second and third microinstructions illustrated in FIG. 5 do not contain a push operation in the special control field. Therefore, during the execution of both these instructions, the output of NAND gate 83 which is used to decode the PUSH microcommand will be a binary ONE indicating that a push operation is not encoded within the microinstruction.

Turning now to the second microinstruction, we see that the hardware interrupt inhibit bit in bit position 34 is a binary ZERO indicating that hardware interrupts are permitted. This binary ZERO appears as signal RDDT34+ at the middle input of AND gate 84 and causes the output thereof, signal DISHIP+, to be a binary ZERO thereby enabling the inputs to hardware interrupt prinet encoder 54. If there are no hardware interrupt signals in the binary ZERO state and no hardware error signals in the binary ZERO state and a clear condition does not exist, all inputs I0 through I10 of encoder 54 will be in the binary ONE state and therefore the output active signal at the P output of encoder 54, signal LSRSAR+, will be a binary ONE.

With signal LDRSAR+ being a binary ONE and signal PUSHOP− being a binary ONE indicating that a push operation is not specified, the output of NAND gate 90, signal PUSHNT+, will be a binary ZERO indicating that a push operation is not to be performed because neither a PUSH microcommand is present, nor is a hardware interrupt pending. With one input of AND gate 92 being a binary ZERO, the output thereof, signal PUSNOT+, will be a binary ZERO at one input of OR gate 94. The other input of OR gate 94, signal CLEARX+, will be binary ZERO if a clear operation is not being performed. Therefore, the output of OR gate 94, signal PUSNEN+, will be a binary ZERO.

Because a pop operation is not specified in the ROS address field of the second microinstruction, the output of inverter 88, signal POPOP+, will be a binary ZERO indicating that a pop operation has not been specified. Signal POPOP+ being a binary ZERO at one input of AND gate 93 will cause the output thereof, signal POPNOT+, to be a binary ZERO. With both inputs to OR gate 95 being binary ZEROs, the output thereof, signal POPNEN+, will be a binary ZERO. Because both shift mode signals, S0 and S1, at the inputs of shift register 70A through 70L are binary ZEROs, the shift registers will not shift nor parallel load when they are clocked by signal PSTROB+ transitioning from the binary ZERO to the binary ONE state and therefore neither a push nor pop nor load operation will be performed during the execution of this microinstruction.

During the execution of this microinstruction, the A inputs to address multiplexer 2 62 will be gated onto the Q output thereof because the selection signal, LDRSAR+, is a binary ONE as seen above. Therefore, the output of address multiplexer 1 60 will be loaded into ROS address register 63. Late in the execution of the current microinstruction when the output of return multiplexer 61 is strobed by signal PSTROB+ transitioning from the binary ZERO to the binary ONE state, the output of ROS address register 63 which contains the next address is loaded into ROS address history register 66 and thereafter incremented by one of incrementer 64. Thereafter, when the next microinstruction is executed as the current microinstruction, ROS address history register 66 will contain the current address and the current address +1 as generated by incrementer 64 will be at the A input of return multiplexer 61.

If during the execution of this second microinstruction in which hardware interrupts are enabled by bit 34 being a binary ZERO, a hardware interrupt occurs. The output active signal, LDRSAR+, from the P output of encoder 54 will be a binary ZERO indicating that a hardware interrupt or error condition or clear condition has occurred and the B input of address multiplexer 2 62 will be enabled onto the Q output thereof. The B input to address multiplexer 2 62 is comprised of the binary encoded bits Q1 through Q8 from encoder 54 along with eight leading binary ZEROs in the eight most significant bits such that the Q output of address multiplexer 2 62 will be a 12-bit binary address corresponding to the starting location of a hardware interrupt service routine which is preprogrammed to handle a particular hardware interrupt or hardware error or clear condition.

The output of address multiplexer 2 62 is input into ROS address register 63 and from there output to read only storage 24 so that the first word of the hardware interrupt service routine may be fetched and executed. The address of the first word of the hardware interrupt service routine is also loaded into address history register 66 from ROS address register 63 during the execution of the second microinstruction in ROS data register 65 when signal PSTROB+ clocks (transitions from the binary ZERO to the binary ONE state). At the same time that the address is clocked from ROS address register 63 into ROS address history register 66, the output of return multiplexer 61 is pushed onto return address stack 70.

The output of return multiplexer 61 will be the output of address multiplexer 1 60 which will be the nominal next microinstruction address which appears at the B input of return multiplexer 61. As seen above, the B input of return multiplexer 61 is placed on the Q output thereof because select signal LDRSAR+ is a binary ZERO whenever there is an active output from encoder 54. Shift register 70A through 70L do a push operation (right shift) because signal PUSNEN+ from OR 94 is a binary ONE and signal POPNEN+ from OR gate 95 is a binary ZERO. Signal PUSNEN+ is a binary ONE and POPNEN+ is a binary ZERO because signal LDRSAR+ is a binary ZERO, signal CLEARX+ is a binary ZERO, signal PUSHOP− is a binary ONE and signal POPOP+ is a binary ZERO at the inputs to gates 90 through 95, the operation of which is described above.

During the execution of the third microinstruction illustrated in ROS data register 65 in FIG. 5, a pop operation is performed as specified in the ROS address field. The pop operation indicated above is decoded by OR gate 86, the output of which, signal POPOP−, will be a binary ZERO indicating that a pop operation is to be performed. Signal POPOP− being a binary ZERO will enable the output of driver 60B within address multiplexer 1 60 such that the A input of address multiplexer 2 will be the signals STKO00 through STKO11 which are the twelve bits which correspond to the QA outputs of shift registers 70A through 70L. These twelve signals correspond to the top address within the return address stack 70. The outputs of driver 60A are disabled by signal JUMP− being a binary ONE. Thus, the output of address multiplexer 1 60 will be the top address in return address stack 70 which corresponds to the contents of register 71 in FIG. 4.

No hardware interrupt occurs during the execution of this POP microinstruction. The A inputs of address multiplexer 2 62 will be selected to be output as the Q output and thereby loaded into ROS address registers 63 which specifies the address of the next instruction to be fetched from read only store 24. As in this case of a POP instruction without the occurrence of a hardware interrupt, the next instruction read from read only store 24 will be the instruction which was addressed by the top location within return address stack 70. If no hardware interrupt occurs during the execution of this POP microinstruction, signal LDRSAR+ output by encoder 54 will be a binary ONE indicating that none of its outputs are active. Because a push operation was not specified in the special control field, signal PUSHOP− from NAND gate 83 will be a binary ONE and therefore the output of NAND gate 90, signal PUSHNT+, will be a binary ZERO indicating that no push operation is to be performed. If a clear operation is not taking place as indicated by signal CLEARX+ being a binary ZERO, the output of OR gate 94, signal PUSNEN+, will be a binary ZERO and the output of OR gate 95, signal POPNEN+, will be binary ONE indicating that a left shift (pop) operation is to be performed by shift registers 70A through 70L. This will pop the return address stack 70 one location when signal PUSTROB+ transitions from the binary ZERO to the binary ONE state.

When this left shift operation of shift registers 70A through 70L occurs, the bits at the shift left serial input (LI) of the twelve 4-bit shift registers are loaded into the shift registers. As can be seen in FIG. 5, shift registers 70A through 70K contain a binary ZERO at this input, and shift register 70L contains a binary ONE at this input thus resulting in the bottom location within return address stack (register 74) in FIG. 4 being loaded with the hexadecimal value is used 001. This 001 value is used as an address within read only storage 24 of a routine that is microprogrammed to handle the case of overpopping the stack which will occur if this 001 hexadecimal is ever popped off the top of the stack.

This same ROS address of 001 hexadecimal is simultaneously loaded into registers 71 through 74 of return address stack 70 when a clear operation is performed by parallel loading all four inputs of shift registers 70A through 70K with binary ZEROs by having a binary ZERO at the PIA, PIB, PIC and PID inputs of registers 70A through 70K and binary ONEs at the corresponding inputs of register 70L and doing a parallel load by having signals PUSNEN+ and POPNEN+ equal to binary ZEROs when these registers are clocked by PSTROB+ transitioning from the binary ZERO to the binary ONE state during a clear operation. This is accomplished because signal CLEARX+ is a binary ONE during a clear operation forcing the outputs of OR gates 94 and 95 to be binary ONEs thereby setting the shift mode select signals S0 and S1 both equal to binary ONEs.

As discussed above with respect to FIG. 4, if a hardware interrupt occurs during the execution of a microinstruction which contains a pop operation as does the third microinstruction illustrated in FIG. 5, the push operation associated with the hardware interrupt cancels the pop operation of the microinstruction and the return address stack is neither pushed nor popped. The method by which this is accomplished will now be discussed with respect to FIG. 5.

If the third microinstruction which contains the pop operation in the ROS address field also contains a hardware interrupt inhibit bit of binary ZERO, a hardware interrupt can occur during the execution of the POP microinstruction. As seen above, during the execution of a microinstruction which contains the POP microcommand, the output of driver 60B will be enabled such that the output of address multiplexer 1 60 will be the return address which is contained in the top of return address stack 70. The output of address multiplexer 1 60 is presented to the A input of address multiplexer 2 62 and the B input of return multiplexer 61. As seen above, if a hardware interrupt occurs, signal LDRSAR+ from encoder 54 is a binary ZERO selecting the B input of both address multiplexer 2 62 and return multiplexer 61. Thus, the output of address multiplexer 2 will be the vectored address as determined by encoder 54 at which is located the hardware interrupt service routine. The output of return multiplexer 61 will be the output of driver 60B which is the output of the top of return address stack 70.

Thus, the ROS address register 63 will be loaded with the starting address of the hardware interrupt service routine associated with the highest priority interrupt pending and that location will be fetched from read only storage 24 to begin the execution of the hardware interrupt service routine. With signal LDRSAR+ being a binary ZERO, the output of NAND gate 90, signal PUSHNT+, will be a binary ONE indicating that a push operation should be performed on return address stack 70. Because a POP microcommand is encoded in ROS address field, the output of OR gate 86, signal POPOP−, will be a binary ZERO thereby causing the output of inverter 88, signal POPOP+, to be a binary ONE indicating that a pop operation should be performed on return address stack 70. With both inputs to NAND gate 91 being binary ONEs, the output thereof, signal PUSPOP−, will be a binary ZERO indicating that both a push and pop operation is to be performed simultaneously on return address stack 70.

Signal PUSPOP− being a binary ZERO will disable AND gates 92 and 93 and cause signals PUSNOT+ and POPNOT+ to be binary ZEROs indicating that neither a push nor pop operation is to be performed. Because a clear operation is not being performed, signal CLEARX+ will be a binary ZERO and therefore the output of OR gates 94 and 95 will be binary ZEROs indicating that neither a shift nor load operation is to be performed on shift registers 70A through 70L. Therefore, a POP microcommand within the microinstruction cancels the implicit push operation of the hardware interrupt resulting in neither the pushing nor the popping nor the parallel loading of return address stack 70.

From the above discussion it can appreciated that NAND gate 91 is used to detect the simultaneous occurrence of a push and pop operation and to inhibit the simultaneous pushing and popping of return address stack 70 when this condition occurs. This condition can occur when a POP microcommand is encoded within a microinstruction and a hardware interrupt occurs the combination of which prevents the movement of the stack in either direction. From the above discussion, it can also be appreciated how the stack is loaded at the bottom register each time it is popped with an address of a routine which is used to detect the overpopping of the stack and how the stack is initialized during a clear operation so that each register within the stack contains this address of the overpopping service routine.

While a preferred embodiment has been described, other modifications will be readily suggested by those of ordinary skill in the art. For example, if hardware interrupts are not inhibited during a hardware interrupt service routine, the stacking mechanism of the invention can be used to nest hardware interrupts. Also, although the preferred embodiment has been described in terms of 4-bit shift registers, if a register containing more bits is utilized, the push down depth of the stack will be equal to the number of bits in the expanded shift register thus allowing greater nesting depth of subroutines and interrupts. In addition, a stack mechanism comprised of registers comprised of flip-flops as described in U.S. Pat. No. 3,909,797 could be used in lieu of the shift registers of the preferred embodiment, provided that the logic of the present invention which is used to detect an attempt to do a simultaneous push and pop operation is utilized so that neither a push nor pop operation is done.

It should be noted that the ROS address field to the subroutine can be either a conditional or unconditional branch. This is especially advantageous with the system described since the next address is continually provided by the ROS address field of microinstructions from read only storage 24. Nevertheless, it would be equally applicable in those addressing methods in where a sequence counter is used. Both addressing methods require the utilization of the PUSH microcommand to enable the storing of the address of the next instruction which would otherwise be executed if a branch was not made to the subroutine.

While the invention has been shown and described with reference to the preferred embodiment thereof, it will be understood by those skilled in the art that the above and other changes in form and detail may be made therein without departing from the spirit and scope of the invention.

What is claimed is:

1. A method of effecting transfers to and from subroutines and interrupt service routines comprising the steps of:
   A. generating a first microinstruction of a routine from a memory which identifies a branch to subroutine;
   B. executing a branch to a subroutine; said branch executing step including:
      a. inhibiting the occurrence of inhibitable interrupts,
      b. transferring a current address of said first microinstruction in a current address register to an incrementer,
      c. incrementing said current address to produce an incremented address,
      d. storing said incremented address, which is a return address, in a first register of a push-down stack,
      e. transferring previous return addresses into adjacent registers one level down in said push-down stack simultaneously with the storing of said incremented address,
      f. transferring a next address in said first microinstruction into a next address register if no interrupt is pending or if all pending interrupts are inhibited,
      g. transferring said next address in said next address register into said current address register, and
      h. generating a second microinstruction, which is a first microinstruction of a subroutine, from said memory using said next address from said next address register,
   C. generating an interrupt to an interrupt service routine, said interrupt generating step including:
      a. generating a vectored interrupt address of a highest priority non-inhibited pending interrupt if a pending non-inhibited interrupt exists,
      b. transferring said vectored interrupt address into said next address register if interrupts are not inhibited,
      c. storing a next address from a current microinstruction, which is said return addresss, into said first register of said push-down stack if interrupts are not inhibited,
      d. transferring previous return addresses into adjacent registers one level down in said push-down stack simultaneously with the storing of said return address,
      e. transferring said vectored interrupt address in said next address register into said current address register, and
      f. generating a third microinstruction, which is a first microinstruction of a first interrupt service routine, from said memory using said vectored interrupt address from said next address register,
   D. generating a microinstruction from said memory which identifies a return from said subroutines or said interrupts; and
   E. executing a return from said subroutines or interrupts, said return executing step including:
      a. transferring said return address from said first register in said push-down stack to said next address register if no interrupts are pending or if all pending interrupts are inhibited,
      b. transferring previous return addresses into said adjacent registers one level up in said push-down stack simultaneously with said transferring said return address to said next address register,
      c. generating said vectored interrupt address of said highest priority non-inhibited pending interrupt if a pending non-inhibited interrupt if a pending non-inhibited interrupt exists,
      d. transferring said vectored interrupt address into said next address register if interrupts are not inhibited, and
      e. generating a fourth microinstruction, which is a subsequent microinstruction to the microinstruction which branches to a subroutine, if no non-inhibited interrupts are pending, or a first microinstruction of a subsequent interrupt service routine if said pending non-inhibited interrupt exists, from said memory using an address from said next address register.

2. The method as defined in claim 1 wherein said branch executing step to a subroutine is repeated several times before said return executing step occurs.

3. The method as defined in claim 1 wherein said interrupt generating step to said interrupt service routine followed by said return step from said interrupt service routine occurs before said return step from said subroutine occurs.

4. The method as defined in claim 1 wherein said branch executing step to said subroutine includes the steps of:
   a. enabling a first multiplexer by an address field of a current microinstruction generated from said memory having a first value to select the next address from said current microinstruction; and
   b. enabling a return multiplexer to select said return address from the output of said incrementer when all pending interrupts are inhibited and to select the return address from the output of said first multiplexer if there are pending interrupts that are not inhibited.

5. The method as defined in claim 4 wherein said interrupt generating step to said interrupt service routine includes the steps of:
   a. enabling a second multiplexer to select said vectored interrupt address of the highest priority non-inhibited pending interrupt to be the next address, and
   b. enabling a return multiplexer to select said return address from the output from said first multiplexer.

6. The method as defined in claim 5 wherein said return executing step from said subroutines or interrupts includes enabing said first multiplexer by said address field of said current microinstruction generated from said memory having a second value to select the next address from said first register of said push-down stack.

7. The method as defined in claim 6 wherein the step of storing said return address in said push-down stack is accomplished by shifting a plurality of shift registers one position in a first direction and said step of transferring said returning address from said push-down stack is accomplished by shifting said plurality of shift registers one position in a second direction that is opposite said first direction.

8. The method as defined in claim 1 wherein said step of inhibiting the occurrence of inhibitable interrupts prevents, absent a pending non-inhibitable interrupt, said step of generating an interrupt from occurring during the execution of said current microinstruction so that the execution of said current microinstruction will be immediately followed by the execution of a subsequent microinstruction generated from said memory, wherein the address of said subsequent microinstruction is determined by the execution of said current microinstruction and not by said vectored interrupt address of an inhibitable interrupt.

9. The method as defined in claim 1 wherein said step of transferring said next address in said next address register into said current address register is simultaneous with said step of storing said incremented address in said first register of said push-down stack.

10. The method as defined in claim 1 wherein said step of transferring said vectored interrupt address in said next address register into said current address register is simultaneous with said step of storing said next address from a current microinstruction into said first register of said push-down stack.

11. The method as defined in claim 1 wherein said push-down stack is initialized with an overpop service routine address and said step of transferring previous return addresses into adjacent registers one level up includes transferring into a last register of said push-down stack said overpop service routine address so that performing too many transfers of said return address from said first register of said push-down stack will result in execution of said overpop service routine.

12. A data processing system for executing a routine which accesses a plurality of subroutines and for executing a plurality of interrupt service routines in response to a plurality of interrupts, said system comprising:
A. means for providing a sequence of microinstructions, each microinstruction containing address fields to define an address of a microinstruction of said providing means and command fields to define transfer paths, one type of said microinstruction specifying a branch to said subroutines and a second type of said microinstructions specifying a return from said subroutines or interrupt service routines;
B. means for altering said sequence of microinstructions provided by said providing means in response to an uninhibited interrupt occurring, said means for altering providing a vectored interrupt address to said providing means which is used as a starting address of an interrupt service routine;
C. storing means including:
   a. a plurality of registers serially intercoupled, one of said plurality of registers being a top end, another of said plurality of registers being a bottom end, the remaining of said plurality of registers being intermediate said top and said bottom end, each of said plurality of registers being adapted to hold one return address,
   b. first means coupled to said top end and said remaining registers and responsive to said providing means for serially propagating the return addresses to said bottom end of said plurality of registers and,
   c. bottom means coupled to said bottom end and said remaining registers and responsive to said providng means for serially propagating the return addresses to said top end of said plurality of registers,
   wherein said storing means is responsive to said one type of microinstruction and to the occurrence of non-inhibited interrupts for sequentially storing return addresses of previous routines and subroutines in said top end register; and
   means responsive to a series of said second type microinstruction for sequentially transferring to said providing means from said top end register of said storing means in a reverse order said return addresses.

13. A system as defined in claim 12 wherein a first command field of said command fields of said microinstructions has a first value for enabling said storing means to receive said return addresses from said transferring means and wherein a first address field of said address fields of said microinstruction has a first value for enabling said storing means to deliver said return addresses to said transferring means.

14. A system as defined in claim 13 further including means for incrementing said address of said providing means by a predetermined number, and wherein said top end register receives said incremented address from said incrementer means in response to said first value in said first command field.

15. A system as defined in claim 14 wherein a second command field of said command fields of said microinstructions has a first value for inhibiting interrupts and a second value for permitting interrupts and wherein said first value of said second command field is used in conjunction with said first value of said first command field to prevent an interrupt from occurring during the storing a said return address while branching to one of said subroutines.

16. A system as defined in claim 14 further including a means for disabling said storing means from transferring to said providing means said return address from said top end register if a non-inhibited interrupt occurs during said second type of said microinstructions that specify a return from said subroutines or interrupt service routines.

17. A system as in claim 13 wherein said storing means is comprised of a plurality of shift registers.

18. A data processing system for sequentially accessing routines and subroutines and for accessing interrupt service routines; said system comprising:

A. means for providing a sequence of microinstructions, each microinstruction address being addressed by an address within said providing means, each microinstruction containing address fields to define a next address of a microinstruction of said providing means and command fields to define transfer paths, a first address field of said address fields having a first value which specifies a branch to said subroutines and a second value which specifies a return from said subroutines or interrupt service routines, a first command field of said command fields having a first value specifying a transfer of return addresses and a second command field of said command fields having a first value specifying an inhibiting of interrupts and a second value specifying an enabling of interrupts;

B. means for receiving an address from said providing means, said address from said receiving means being a next address;

C. storing means including:
   a. a plurality of registers serially intercoupled, one of said plurality of registers being a top end register, another of said plurality of registers being a bottom end register, the remaining of said plurality of registers being intermediate said top and said bottom end registers, each of said plurality of registers being adapted to hold one return address;
   b. first means coupled to said top end and said remaining registers and responsive to said first command field having a first value for serially propagating said return addresses to said bottom end of said plurality of registers;
   c. second means coupled to said bottom end and said remaining registers and responsive to said first address field having said second value for serially propagating said return addresses to said top end of said plurality of registers;
   d. said top end register receiving said return address in response to said first address field having said first value and to said first command field having said first value; and D. means for transferring responsive to said first address field having said second value for transferring said return address from said top end register to said receiving means, said return address becoming said next address.

19. A system as defined in claim 18 and further including:
incrementer means coupled to said receiving means for incrementing by a predetermined number a current address to produce an incremented current address, said current address being said address within said providing means used to provide a current microinstruction, said first command field having said first value enabling said incremented current address to be transferred to said top end register, said incremented address being a return address.

20. A system as defined in claim 18 wherein said storing means further includes first means responsive to said first address field having said second value, and said second command field having said second value and the occurrence of a non-inhibited interrupt for holding said return addresses contained in said top end, bottom end, and remaining registers of said plurality of registers.

21. A system as defined in claim 20 wherein said providing means includes:
A. an output register coupled to said storing means for receiving said current microinstruction containing said first address field, said first command field, and said second command field,
B. first decoding means coupled to said output register and responsive to said first address field having said second value for partially enabling said first means,
C. second decoding means coupled to said output register and responsive to said second command field having said second value for partially enabling said first means, and
D. interrupt means coupled to said first means and responsive to the occurrence of an interrupt for partially enabling said first means.

22. A system as defined in claim 21 wherein said first address field having a first value and said first command field having a first value and said second command field having said first value is provided in a microinstruction branching to said subroutines and wherein said first address field having said second value is provided in a last microinstruction of said subroutines and interrupt service routines.

23. A system as defined in claim 18 where one of said command fields specifies that said branch to a subroutines specified by said first address field having said first value is to be performed only if a specified condition is met.

24. A system as defined in claim 18 wherein said first address field is independent of said first command field.

25. A system as defined in claim 24 wherein said second command field is independent of said first command field.

26. A system as defined in claim 18 wherein said plurality of registers is comprised of a plurality of shift registers.

27. A system as defined in claim 1 wherein said branch executing step or said interrupt generating step can be done in the same microcycle used to execute said current microinstruction.

* * * * *